(12) United States Patent
Phillip et al.

(10) Patent No.: US 8,337,571 B2
(45) Date of Patent: Dec. 25, 2012

(54) REMOVAL OF IMPURITIES IN THE PRODUCTION OF CRYSTALLINE SODIUM CARBONATE, BICARBONATE, OR SULFITE

(75) Inventors: James D. Phillip, Green River, WY (US); Jessica A. Mote, Lyman, WY (US); David W. Smith, Rock Springs, WY (US)

(73) Assignee: Solvay Chemicals, Inc., Houston, TX (US)

( * ) Notice: Subject to any disclaimer, the term of this patent is extended or adjusted under 35 U.S.C. 154(b) by 474 days.

(21) Appl. No.: 12/718,098

(22) Filed: Mar. 5, 2010

(65) Prior Publication Data
US 2010/0226840 A1    Sep. 9, 2010

Related U.S. Application Data

(60) Provisional application No. 61/158,126, filed on Mar. 6, 2009, provisional application No. 61/289,534, filed on Dec. 23, 2009.

(51) Int. Cl.
*B01D 9/00* (2006.01)

(52) U.S. Cl. .................................... 23/300; 23/295 R

(58) Field of Classification Search .................. 23/300, 23/295 R, 302 R, 302 T
See application file for complete search history.

(56) References Cited

U.S. PATENT DOCUMENTS

| | | | |
|---|---|---|---|
| 1,992,532 A | 2/1935 | Kuhnert | |
| 2,550,708 A | 5/1951 | Meyer | |
| 2,628,155 A | 2/1953 | Gruen | |
| 2,887,364 A | 5/1959 | Harrell et al. | |
| 3,206,303 A | 9/1965 | Goren | |
| 3,652,202 A | 3/1972 | Stewart et al. | |
| 3,870,780 A | 3/1975 | Guptill | |
| 3,975,499 A | 8/1976 | Walden | |
| 3,991,160 A | 11/1976 | Gancy et al. | |
| 4,016,075 A | 4/1977 | Wilkins | |
| 4,021,526 A | 5/1977 | Gancy et al. | |
| 4,022,868 A | 5/1977 | Poncha | |
| 4,044,097 A | 8/1977 | Gancy et al. | |
| 4,738,836 A | 4/1988 | Poncha et al. | |
| 5,624,647 A | 4/1997 | Zolotoochin et al. | |
| 2009/0291038 A1 | 11/2009 | Davoine et al. | |

FOREIGN PATENT DOCUMENTS

CA          414313 A       8/1943
WO    WO 2009/068670 A1   6/2009

OTHER PUBLICATIONS

U.S. Appl. No. 12/743,551, filed Nov. 28, 2008, David M. Hanson et al.

*Primary Examiner* — Edward Johnson
(74) *Attorney, Agent, or Firm* — Beatrice C. Ortego

(57) ABSTRACT

A magnesium treatment for removing water-soluble impurities in a process for making crystalline sodium carbonate, bicarbonate, or sulfite. A waste comprising such impurities is treated with a magnesium compound to form water-insoluble matter which is removed to form a purified solution. The treatment may be performed on a solution which contains the waste and optionally dissolved calcined trona. The purified solution may be used as a feedstock to form crystalline soda ash, and/or used as a reactant to produce crystalline sodium sulfite or bicarbonate via reaction with $SO_2$ or $CO_2$. In preferred embodiments, the waste may comprise a purge or weak liquor, a reclaimed solid, or combinations thereof. The water-soluble impurities may be silicates and/or foam-causing impurities, and the waste may contain sodium bicarbonate, sodium sesquicarbonate, and/or one or more sodium carbonate hydrates, such as decahydrate.

20 Claims, 8 Drawing Sheets

REMOVAL OF IMPURITIES IN THE PRODUCTION OF CRYSTALLINE SODIUM CARBONATE, BICARBONATE, OR SULFITE

CROSS-REFERENCE TO RELATED APPLICATIONS

The present application claims the benefit of U.S. provisional application No. 61/158,126 filed Mar. 6, 2009, and to U.S. provisional application No. 61/289,534 filed Dec. 23, 2009, the whole content of these applications being herein incorporated by reference for all purposes.

STATEMENT REGARDING FEDERALLY SPONSORED RESEARCH OR DEVELOPMENT

Not applicable.

TECHNICAL FIELD OF THE INVENTION

The present invention relates to a method for reducing the content of water-soluble impurities by addition of at least a magnesium compound to a sodium carbonate-containing solution in a process for the production of crystalline product comprising sodium carbonate, bicarbonate, or sodium sulfite, the impurities originating from calcined trona ore and/or from a reclaimed solid recovered from a waste pond or a crystallizer. The water-soluble impurities may include silicates and/or organic foam-causing agents.

BACKGROUND OF THE INVENTION

Soda ash or sodium carbonate is an inorganic salt made from the mineral trona. Soda ash is one of the largest volume alkali commodities made in the United States. Soda ash finds major use in the glass-making industry and for the production of baking soda, detergents and paper products.

Large deposits of the mineral trona in southwestern Wyoming near the Green River Basin have been mechanically mined since the late 1940's. In 2007, trona-based sodium carbonate from Wyoming comprised about 90% of the total U.S. soda ash production. Trona ore is a mineral that contains about 85-95% sodium sesquicarbonate dihydrate ($Na_2CO_3 \cdot NaHCO_3 \cdot 2H_2O$). Trona ore contains insoluble matter in the form of shale. The shale contains various constituents such as organic kerogeneous matter (e.g., 0.1-1% as carbon) and dolomitic and silica bearing materials (e.g., about 5-15%), such as dolomite, quartz, feldspar, clay.

The crude trona is normally purified to remove or reduce impurities, primarily shale and other water insoluble materials, before its valuable sodium content can be sold commercially as: soda ash ($Na_2CO_3$), sodium bicarbonate ($NaHCO_3$), caustic soda (NaOH), sodium sesquicarbonate ($Na_2CO_3 \cdot NaHCO_3 \cdot 2H_2O$), sodium sulfite ($Na_2SO_3$), a sodium phosphate ($Na_5P_3O_{10}$), or other sodium-containing chemicals.

To recover these valuable alkali products, the 'monohydrate' commercial process is frequently used to produce soda ash from trona. In the production of soda ash, crushed trona ore is calcined (e.g., heated) to decompose the sodium sesquicarbonate to sodium carbonate.

$$2Na_2CO_3 \cdot NaHCO_3 \cdot 2H_2O \rightarrow 3Na_2CO_3 + 5H_2O(g) + CO_2(g)$$

The calcination drives off water of crystallization and forms crude soda ash. During calcination, a part of the water insoluble silicate bearing material contained in the ore is converted to soluble silicates. The calcined ore is dissolved in water or dilute sodium carbonate liquor to give a saturated solution of ~30% $Na_2CO_3$ (depending upon the temperature of the solution) containing soluble impurities. The soluble impurities may comprise silicates, organics, chlorides, and sulfates. The insoluble material is separated from the resulting saturated solution. This clear sodium carbonate-containing solution is fed to an evaporative crystallizer. As this solution is heated, evaporation of water takes place effecting the crystallization of sodium carbonate into sodium carbonate monohydrate crystals ($Na_2CO_3 \cdot H_2O$). The monohydrate crystals are removed from the mother liquor and then dried to convert it to anhydrous soda ash ($Na_2CO_3$). The mother liquor is recycled back through a crystallizer circuit for further processing into sodium carbonate monohydrate crystals.

The crystallization step however concentrates impurities in the mother liquor. Indeed, by the effect of water evaporation, the soluble impurities such as organics, silicate, chloride and sulfate, become concentrated in the crystallizer. If this is allowed to continue, eventually the concentration of the impurities builds to a point where the resulting sodium carbonate product quality is negatively impacted. To avoid contamination and deterioration of crystal shape and hardness by the impurities and to prevent the buildup of these impurities in the crystallizer, a portion of the crystallizer liquor must be purged. This can result in a loss of up to about 10% of the soda values. The purge liquor includes soda ash as well as impurities, such as organics, sodium bicarbonate, sodium chloride, sodium sulfate, and sodium silicate. This purge liquor typically contains ca. 23-28% sodium carbonate, 1-4% sodium bicarbonate and 0.2-1% silicate.

In the manufacture of soda ash, a system of storage ponds has been used to accommodate disposal of the effluent streams including mine water, and other sources of waste waters inherent to the process. The purge liquor exiting the crystallizer is typically stored in one or more tailings (waste) ponds which use up large areas of land. In the tailings pond, this purge liquor evaporates and/or cools resulting in the crystallization of sodium carbonate decahydrate contaminated with varying amounts of these impurities, including silicates and organics, the impurities amount in the decahydrate being albeit smaller than the pond solution. This 'deca' deposit on the pond bottom reduces the total pond volume. If this solid mass is not removed, it eventually fills the available pond volume until an increase in pond volume must occur, by raising existing dikes, expanding the existing pond, or constructing a new pond. It would be beneficial to collect and use the deposited sodium carbonate decahydrate mass from the tailings pond, as the removal of this solid mass would free up previously filled volume in the tailings pond. Since the recovered 'deca' mass contains valuable sodium carbonate content that would otherwise have to be mined, it would be beneficial to recycle the collected 'deca' to the monohydrate crystallizer for the purpose of recovering the soda values.

Despite the withdrawal of a portion of the crystallizer liquor as a preventative measure to prevent accumulation of impurities in the crystallizer, the presence of water-soluble silicates in the crystallizer liquor causes severe scaling of the surfaces of equipment in which this saturated solution is handled, for examples lines, tanks, pumps, and particularly the crystallizer heat-exchanger which handles the liquor in a recycling loop connected to the crystallizer. A scale buildup containing silicates generally formed on exposed surfaces of the crystallizer heat exchanger requires frequent and expensive high pressure washes.

Additionally, Applicants have found that the presence of water-soluble silicates in the crystallizer liquor seems to impact the morphology of crystallization, and to render the resulting crystalline sodium carbonate product more friable. Although not desiring to be bound by a theoretical explanation, it is believed that the propensity of small particles formation, also called 'fines', in the final product is caused, at least in part, to the silicate impurities present in the liquor during crystallization. Since there is a specification on particle size distribution on the final crystalline sodium carbonate product, the greater fraction of these fines in the product size distribution diminishes the yield of salable product, and these fines have to be recycled to the process to prevent significant loss in soda values.

Moreover, Applicants have further found that the propensity of fines formation is even greater when a reclaimed solid which comprises sodium carbonate decahydrate is recycled to a sodium carbonate-containing liquor which is ultimately fed to the crystallizer. It is believed that the product degradation is due to the higher amount of silicates being carried over in the liquor from the reclaimed solid which comprises sodium carbonate decahydrate. For example, it has been found that while a calcined trona liquor may contain about 70 ppm silicon, a reclaimed crystalline sodium carbonate decahydrate solid may contain about 600 ppm silicon. When 10% of the liquor is made from dissolved reclaimed sodium carbonate decahydrate solid with the remainder being the dissolved calcined trona, there is almost a doubling in the ppm silicon level in the resulting solution. Consequently, the impact of silicate impurities is even more felt when a reclaimed solid containing sodium carbonate decahydrate is recycled in the soda ash plant for further crystallization.

Applicants have further observed that propensity of foam formation in the sodium carbonate monohydrate crystallizer is an additional operational issue which is even more pronounced when the reclaimed solid comprising sodium carbonate decahydrate recovered from a tailings pond is recycled to the soda ash process to form the crystallizer feed with dissolved calcined trona. It is suspected that the greater foam incidence with this recycle is due to foam-causing agent(s) in the crystallizer feed which are carried over from the recycled reclaimed solid.

In addition to the soda ash production process, other processes utilizing saturated or near-saturated sodium carbonate-containing solutions (e.g., derived from calcined trona) as feedstocks may be impacted by the presence of soluble silicates in such solution, particularly if a portion of such solution is derived from a dissolved reclaimed solid such as a reclaimed solid comprising sodium carbonate decahydrate. Examples of such processes include a sodium sulfite production process which may use a sodium carbonate-containing solution as feedstock to the sulfite reactor, and/or a sodium bicarbonate production process which may use a sodium carbonate-containing solution to serve as feedstock to the bicarbonate reactor. Such process includes forming sodium sulfite or bicarbonate by reaction of a sodium carbonate-containing solution with sulfur dioxide or carbon dioxide gas. Sodium sulfite crystals are typically formed in a sulfite crystallizer, while the sodium bicarbonate crystals are typically formed in the bicarbonate reactor at the same time as the reaction takes place.

Since the sodium carbonate feedstock contains silicate impurities, such silicates concentrate and precipitate in the sodium sulfite or bicarbonate process which would negatively impact the final product quality. For example, there are quality specifications limiting water insoluble matter in photo-grade sodium sulfite imposed by ISO 418 Photography—Processing chemicals—Specifications for anhydrous sodium sulfite. The removal of the silicon-containing impurities before they can contaminate the final crystalline sodium sulfite product would allow the sodium sulfite process which uses dissolved calcined trona and/or dissolved reclaimed solid (such as comprising sodium carbonate decahydrate) as sodium carbonate feedstock(s) to make a photo-grade sodium sulfite.

An existing remedy for decreasing silicate levels in the sodium sulfite process includes cooling a purge stream withdrawn from the crystallizer through cooling units followed by a filtration step to decrease the content in precipitated silicate. Such cooling units can be used to cool the reactor and to decrease the silicate levels when making photo-grade sodium sulfite. As a result, production is limited by the reactor temperature resulting in decreased overall production rates. In addition, this remedy for silicate removal is carried out after crystallization is performed, and as such, there is a buildup of silicate scale on the crystallizer heat exchanger (which is connected in a recirculation loop to the crystallizer).

It is thus apparent that a need exists for a more effective method for reusing a waste in a process to form a final product comprising sodium carbonate, bicarbonate or sulfite, but wherein the waste contains impurities which may cause a negative impact on product quality and/or on operation of the process. A need exists for obtaining a less-friable crystalline anhydrous sodium carbonate product or a photo-grade crystalline sodium sulfite or a bicarbonate product with a reduced silicate content from an impure feedstock solution which comprises water-soluble impurities (e.g., silicates, organics) derived from trona ore and/or from a reclaimed solid or liquor waste. There is also a need to minimize operating costs by reducing downtime for maintenance of equipment which is exposed to silicates (due to cleaning of scale). There is also a need to minimize loss of soda values by recycling a crystalline sodium-containing reclaimed solid recovered from a waste pond and/or a waste liquor carrying silicates and organic impurities, yet without impacting the quality and yield of salable soda ash product or the quality of other products (e.g., sodium sulfite, sodium bicarbonate) which are made from sodium carbonate-containing solutions, particularly those comprising the recycled waste. There is also a need to reduce operational issues (such as scaling of equipment, foaming in crystallizer) created at least in part from the reintroduction of impurities such as water-soluble silicates and/or organics when recycling a reclaimed solid recovered from a tailings pond or a secondary crystallizer.

SUMMARY OF THE INVENTION

To address one or more of the issues discussed above, the present invention includes the valorization of a waste containing water-soluble impurities by using a method to remove some of these impurities before being feeding the valorized treated matter to a process to form a final product. Such removal method increases the value of the waste by rendering it more acceptable as a feed to the process, especially when some of these water-soluble impurities present in the waste may negatively impact the product quality and/or cause operational difficulties. The waste may be a liquid or solid stream which originates from the process itself or may be a waste which originates from another process but which becomes an acceptable feed after subjecting it to such method. For example a waste stream from a soda ash plant may be reused in the same soda ash plant or may be reused in the production of sodium bicarbonate or sulfite.

In the context of forming a sodium-based product such as sodium carbonate, sodium bicarbonate and/or sodium, sulfite, the removal method preferably includes a magnesium treatment, and the waste preferably contains sodium values, such as sodium carbonate or bicarbonate in an anhydrous form or hydrated form. Such magnesium treatment may provide at least one of the following advantages or effects: reducing the content in water-soluble impurities (e.g., silicates, organics such as foam-causing agents) in a solution or solid comprising or consisting of the waste after it has been treated with magnesium; reducing the silicon and/or silicates content of the final product comprising crystalline sodium carbonate, sodium bicarbonate or sodium sulfite; improving the physical properties of a final product comprising crystalline sodium carbonate, sodium bicarbonate and/or sodium, sulfite (e.g., less friability for soda ash product, or improved photo-grade property for sodium sulfite); reducing the incidence of operational upsets a crystallizer and/or its heat exchanger (e.g., scale and/or foam formation); or any combinations of two or more thereof.

A first embodiment of the present invention relates to a method for reducing the content in water-soluble impurities originating from a waste which is used before a crystallization step in a manufacturing process that produces a crystalline product comprising sodium carbonate, sodium sulfite, or sodium bicarbonate. The method comprises the following steps: providing a waste comprising water-soluble impurities selected from the group consisting of silicates, organic foam-causing agents, and combinations thereof; performing a magnesium treatment on at least a portion of said waste to form a treated solution, said treatment comprising adding a magnesium compound to the waste in order to form water-insoluble matter with at least a portion of said impurities, wherein when the waste is in solid form, the waste is dissolved in an aqueous medium before or after the magnesium treatment; passing a liquor comprising at least a portion of said treated solution though at least one separation unit to obtain a purified solution; and forming crystals comprising sodium carbonate, sodium sulfite, or sodium bicarbonate by performing at least the following step: passing at least a portion of the purified solution in a reactor and/or a crystallizer under conditions suitable to form said crystals. When the waste is in solid form, the waste may be dissolved in an aqueous medium before or after the magnesium treatment.

The waste may comprise or consist of a reclaimed solid comprising water-soluble impurities and one compound selected from the group consisting of sodium carbonate decahydrate, sodium carbonate monohydrate, sodium bicarbonate, sodium carbonate heptahydrate, sodium sesquicarbonate, and any combinations of two or more thereof, said reclaimed solid being recovered from a tailings pond or a crystallizer. Such reclaimed solid preferably comprises sodium carbonate decahydrate. The waste may comprise or consist of a reclaimed solid recovered from a tailings pond or a crystallizer.

The waste may comprise or consist of a liquid stream comprising water-soluble impurities and sodium carbonate and/or bicarbonate. The waste may comprise or may be a purge liquor or a weak liquor. The purge liquor preferably exits a crystallizer, and the weak liquor is generated during the separation step.

The waste may comprise or consist of a liquid stream comprising water-soluble impurities and sodium carbonate and/or bicarbonate in which a reclaimed solid is mixed and dissolved. The waste may comprise or consist of a mixture of weak liquor and reclaimed solid, a mixture of purge liquor and reclaimed solid, or a mixture of the three.

The magnesium treatment may be carried out on a waste in liquid form or on a liquid stream in which a solid waste is dissolved (such as a solution which may be unsaturated or saturated/near-saturated in sodium carbonate) to form a treated solution. Alternatively or additionally, the magnesium treatment may be carried out on a solid waste (such as a sodium carbonate-containing reclaimed solid) to form a treated solid, which is then dissolved in an aqueous medium to form the treated solution.

Forming the crystals may comprise performing at least one of the following steps: feeding at least a portion of the purified solution to a sodium carbonate monohydrate crystallizer to form crystals comprising sodium carbonate; or feeding at least a portion of the purified solution and sulfur dioxide to a sodium sulfite reactor and then to a sodium sulfite crystallizer to form crystals comprising sodium sulfite; or passing carbon dioxide and at least a portion of the purified solution and/or at least a portion of a purge liquor exiting a sodium carbonate monohydrate crystallizer to a sodium bicarbonate reactor under conditions effective to form crystals comprising sodium bicarbonate; or combinations thereof. Alternatively or additionally, the crystals formation may comprise feeding at least a portion of the purified solution to a sodium carbonate monohydrate crystallizer to form crystals comprising sodium carbonate and a purge liquor stream, the purge liquor stream being used under crystallization conditions to form a sodium carbonate decahydrate solid contaminated with water-soluble impurities, a portion of the solid being reclaimed, and wherein the waste comprises or consists of the reclaimed solid.

The liquor to be separated may comprise dissolved calcined trona, the dissolution of calcined trona taking place in the aqueous medium before or during the magnesium treatment or taking place in at least a portion of the treated solution after the magnesium treatment.

The treatment with the magnesium compound is carried out on an aqueous solution containing at least a portion of the waste, the aqueous solution being unsaturated in sodium carbonate solution and comprising less than 20 percent sodium carbonate. Alternatively or additionally, the treatment with the magnesium compound is carried out on an aqueous solution containing at least a portion of the waste, the aqueous solution being saturated or near-saturated in sodium carbonate solution and comprises 20 percent or more sodium carbonate.

A second embodiment of the present invention relates to a method for reducing the content in water-soluble impurities of an aqueous solution before a crystallization step in a manufacturing process to produce crystalline sodium carbonate, sodium sulfite, or sodium bicarbonate, the process using a waste (such as reclaimed solid, purge liquor, and/or weak liquor) comprising the water-soluble impurities. The method comprises the following steps:

provising an aqueous solution comprising water-soluble impurities and comprising sodium carbonate, sodium sulfite, or sodium bicarbonate, the water-soluble impurities being selected from the group consisting of silicates, organic foam-causing agents, and combinations thereof, some of the water-soluble impurities being brought in from a dissolved reclaimed solid, a purge liquor, and/or a weak liquor;

treating the aqueous solution with magnesium to form a treated solution, the treatment comprising adding a magnesium compound in a suitable amount and for a time sufficient to form water-insoluble matter (e.g., precipitates and/or complexes) with at least a portion of the impurities;

passing a liquor comprising at least a portion of the treated solution though at least one separation unit to obtain a purified solution which serves as at least a portion of a crystallizer feed;

passing the crystallizer feed through a crystallizer under crystallization conditions effective to form crystals comprising sodium carbonate monohydrate, or crystals comprising sodium sulfite, or crystals comprising sodium bicarbonate; and drying the crystals to form a crystalline final product comprising sodium carbonate, sodium sulfite, or sodium bicarbonate.

When the aqueous solution comprises sodium carbonate or sodium bicarbonate, the reclaimed solid, purge liquor, and/or weak liquor preferably comprises one sodium compound selected from the group consisting of sodium carbonate decahydrate, sodium carbonate monohydrate, sodium bicarbonate, sodium carbonate heptahydrate, sodium sesquicarbonate, and any combinations of two or more thereof.

A third embodiment of the present invention relates to a method for reducing the content of water-soluble impurities in a sodium carbonate-containing aqueous solution to produce crystalline soda ash, sodium sulfite, or sodium bicarbonate in a process which uses calcined trona and a waste which contains a reclaimed solid. The method comprises the following steps:

providing a waste comprising or consisting of a reclaimed solid comprising water-soluble impurities being selected from the group consisting of silicates, organic foam-causing agents, and combinations thereof, said reclaimed solid further comprising one sodium compound selected from the group consisting of sodium carbonate decahydrate, sodium carbonate monohydrate, sodium carbonate heptahydrate, sodium bicarbonate, sodium sesquicarbonate, and any combinations of two or more thereof;

performing a magnesium treatment on at least a portion of said waste to form a treated solution, said treatment comprising adding a magnesium compound to the waste in order to form water-insoluble matter (e.g., precipitates and/or complexes formed with magnesium) with at least a portion of said impurities, wherein the waste is dissolved in an aqueous medium before or after the magnesium treatment;

passing a liquor comprising at least a portion of said treated solution though at least one separation unit to remove insoluble matter in order to obtain a purified solution; and performing at least one of the crystallization steps:

passing a first crystallizer feed comprising at least a portion of said purified solution through a sodium carbonate monohydrate crystallizer under crystallization promoting conditions to form sodium carbonate monohydrate crystals;

passing at least a portion of said purified solution comprising sodium carbonate to a sodium sulfite plant where sodium carbonate is reacted with sulfur dioxide to form a sodium sulfite-containing stream and then passing a second crystallizer feed comprising at least a portion of said sodium sulfite-containing stream through a sodium sulfite crystallizer under crystallization promoting conditions suitable to form sodium sulfite crystals;

passing a third crystallizer feed comprising at least a portion of said purified solution and/or at least a portion of a purge liquor comprising sodium carbonate through a sodium bicarbonate crystallizer under crystallization promoting conditions comprising passing carbon dioxide to form sodium bicarbonate crystals, optionally said purge or mother liquor exiting a sodium carbonate monohydrate crystallizer.

The method may further include recovering and drying said crystals comprising sodium carbonate or comprising sodium sulfite or comprising sodium bicarbonate to form a final product.

A fourth embodiment of the present invention relates to a method for reducing the content of water-soluble impurities in a sodium carbonate-containing aqueous solution to produce crystalline soda ash, sodium sulfite, or sodium bicarbonate in a process which uses calcined trona and a waste which is a reclaimed solid, the method comprising the following steps: providing a reclaimed solid comprising water-soluble impurities being selected from the group consisting of silicates, organic foam-causing agents, and combinations thereof, said reclaimed solid further comprising one sodium compound selected from the group consisting of sodium carbonate decahydrate, sodium carbonate monohydrate, sodium carbonate heptahydrate, sodium bicarbonate, sodium sesquicarbonate, and any combinations of two or more thereof; providing an unsaturated sodium carbonate-containing solution comprising dissolved reclaimed solid and/or a saturated or near-saturated sodium carbonate-containing solution comprising dissolved reclaimed solid and dissolved calcined trona; performing a magnesium treatment to form a treated solution, said treatment comprising adding a magnesium compound to at least a portion of the unsaturated sodium carbonate-containing solution or to at least a portion of the saturated or near-saturated sodium carbonate-containing solution or to both in order to form water-insoluble matter with at least a portion of said impurities; passing a liquor comprising at least a portion of said treated solution through at least one separation unit to remove insoluble matter and to obtain a purified solution; performing at least one of the crystallization steps as described above to form crystals comprising sodium carbonate monohydrate, or crystals comprising sodium sulfite, or crystals comprising sodium bicarbonate. The method may further include recovering and drying the crystals comprising sodium carbonate or comprising sodium sulfite or comprising sodium bicarbonate to form a final product.

The method may further comprise dissolving calcined trona with the aqueous solution containing sodium carbonate before or during or after the magnesium treatment, but before the separation step.

An additional embodiment of the present invention further relates to a magnesium treatment which reduces the content of water-soluble impurities in an aqueous solution containing sodium carbonate, bicarbonate, or sulfite being carried out at one or more locations in the process for the production of crystalline sodium carbonate, bicarbonate, or sulfite.

For a soda ash plant, the present method is useful in minimizing maintenance of equipment particularly of the crystallizer heat exchanger. The present invention is particularly advantageous to minimize soda ash product friability when a reclaimed solid comprising crystalline sodium carbonate decahydrate, generally formed from a crystallizer purge stream in a pond or a decahydrate crystallizer, is recycled into the soda ash production plant to produce additional salable product without sacrificing product quality. Reducing friability of the soda ash is not only beneficial for the product sizing and customers, but also it increases production capacity as some of these broken crystals (fines) get recycled back to the crystallizer either as solution or crystals. If fines are removed from the final product and dissolved in water or a weak liquor solution, they need to be recrystallized and dried, both of these steps cause a reduction of capacity; or if fines are recycled in the form of crystals, they will rehydrate and need to be dried causing a reduction of capacity.

For a sodium sulfite production, the present invention is also advantageous to produce a crystalline sodium sulfite product with a reduced silicate content resulting in improved photo-grade quality.

For a sodium bicarbonate production, the present invention is also advantageous to produce a crystalline sodium bicarbonate product with a reduced silicates content.

Another embodiment of the present invention relates to a method for reducing the content of water-soluble impurities in a sodium carbonate-containing aqueous solution to produce crystalline sodium carbonate, sodium sulfite, or sodium bicarbonate in a process which uses dissolved calcined trona and a dissolved reclaimed solid. Such method comprises the following steps:

providing an unsaturated aqueous sodium carbonate-containing solution comprising a dissolved reclaimed solid, the reclaimed solid comprising water-soluble impurities being selected from the group consisting of silicates, organic foam-causing agents, and combinations thereof, the reclaimed solid further comprising one sodium compound selected from the group consisting of sodium carbonate decahydrate, sodium carbonate monohydrate, sodium carbonate heptahydrate, sodium bicarbonate, sodium sesquicarbonate, and any combinations of two or more thereof;

providing a saturated or near-saturated aqueous sodium carbonate-containing solution by dissolving calcined trona with an aqueous medium comprising at least a portion of the unsaturated aqueous sodium carbonate-containing solution;

performing a magnesium treatment by adding a magnesium compound to at least a portion of the unsaturated solution or to at least a portion of the saturated or near-saturated solution or to both to form water-insoluble precipitates and/or complexes with at least a portion of the impurities;

passing the saturated or near-saturated sodium carbonate-containing solution, at least a portion of which has been treated with magnesium, through at least one separation unit to remove insoluble matter and/or complexes and to obtain a purified solution;

performing at least one of the crystallization steps as described above to form crystals comprising sodium carbonate monohydrate, or crystals comprising sodium sulfite, or crystals comprising sodium bicarbonate; and recovering and drying the crystals to form a final product comprising sodium carbonate or sodium sulfite or sodium bicarbonate.

In any of the method embodiments, the waste which is a reclaimed solid may be recovered from a tailings pond or at least one crystallizer.

The separating step in the method may generate a weak liquor stream which may provide at least a portion of the aqueous medium in which the waste is mixed or dissolved before (preferably) or after the magnesium treatment so as to form an aqueous solution which may be unsaturated or saturated/near-saturated in sodium values.

In some embodiments, a purge liquor stream exits a sodium carbonate monohydrate or sodium bicarbonate crystallizer, and the method may further comprise storing at least a portion of the purge liquor stream in a tailings pond whereby crystals are formed via evaporative and/or cooling crystallization resulting in a deposit contaminated with water-soluble impurities including silicates and/or foam-causing agents, at least a portion of such deposit is recovered to provide a reclaimed solid which is recycled to the process for making sodium carbonate and/or sodium bicarbonate. The reclaimed solid may contain sodium carbonate decahydrate, sodium bicarbonate, sodium sesquicarbonate, and/or other sodium carbonate hydrates.

Alternatively or additionally, some or all of the purge liquor stream may be treated with magnesium before it is fed to the tailings pond and/or before being recycled to the process for making sodium carbonate, bicarbonate and/or sulfite.

In some embodiments for the production of sodium carbonate, the purge liquor stream exiting the sodium carbonate monohydrate crystallizer is passed to a tailings pond under crystallization conditions to form a decahydrate solid contaminated with water-soluble impurities, the reclaimed solid comprising or consisting of at least a portion of such recovered decahydrate solid to be recycled to a process which produces sodium carbonate, sodium bicarbonate and/or sodium sulfite. The portion of such recovered decahydrate solid may be dissolved in an aqueous medium such an unsaturated aqueous sodium carbonate-containing solution for recycling in the process.

In other embodiments for the co-production of sodium carbonate and bicarbonate, a first purge liquor stream exits the sodium carbonate monohydrate crystallizer and is passed to a bicarbonate crystallizer (or reactor) under crystallization conditions to form bicarbonate crystals and to form a second purge liquor stream containing water-soluble impurities. The second purge liquor stream exiting the sodium bicarbonate crystallizer is then passed to a tailings pond under crystallization conditions to form a solid comprising sodium bicarbonate and/or sodium sesquicarbonate and containing these water-soluble impurities, at least a portion of such solid being recovered and dissolved in an unsaturated aqueous sodium carbonate-containing solution for recycling in the co-production process. Alternatively or additionally, some or all of the first purge liquor stream may be treated with magnesium before it is fed to the sodium bicarbonate crystallizer and some or all of the second purge liquor stream may be treated with magnesium before it is fed to the tailings pond.

The separation step preferably includes passing the liquor, a portion of which has been treated (such as a solution which is saturated or near-saturated in sodium carbonate) through a classifier for removing water insoluble matter and for recovering a classifier overflow; feeding the classifier overflow to a thickener to remove additional water-insoluble matter; and filtering the thickener overflow to provide the clear or purified solution. At least a part of the clear or purified solution may serve as at least a portion of a feed to the sodium carbonate monohydrate crystallizer or to a sodium sulfite reactor or to a sodium bicarbonate reactor.

The magnesium treatment may comprise at least one of the following steps selected from the group consisting of:

adding the magnesium compound to the reclaimed solid either before or after its dissolution;

adding the magnesium compound to a dissolver, the dissolver being used to melt and/or dissolve the reclaimed solid;

adding the magnesium compound to a secondary thickener comprising dissolved reclaimed solid, the secondary thickener being used in the separation step;

adding the magnesium compound to a weak liquor stream comprising dissolved reclaimed solid;

adding the magnesium compound to a weak liquor tank, the weak liquor tank comprising a weak liquor exiting a secondary thickener used in the separation step;

adding the magnesium compound to a leach tank, the leach tank being used to dissolve calcined trona in at least a part of the unsaturated aqueous solution comprising the dissolved reclaimed solid;

adding the magnesium compound to a saturated or near-saturated aqueous solution comprising dissolved reclaimed solid and dissolved calcined trona at any point between the leach tank and a primary thickener used in the separation step;

adding the magnesium compound to a classifier used in the separation step or to an overflow exiting the classifier;

adding the magnesium compound to a primary thickener used in the separation step or to an overflow exiting the primary thickener;

adding the magnesium compound to a centrate liquor withdrawn from the monohydrate crystallizer and separated from crystals; and any combinations of two or more of these steps.

Although the magnesium treatment may include adding the magnesium compound to a centrate liquor which is recycled to a crystallizer, this step is not preferred, since such step may add magnesium in the final product and may result in formation of insolubles where they will do the most damage to the crystallizer heat exchanger. If the magnesium treatment includes adding the magnesium compound to a centrate liquor, a separation step (such as filtration) may be performed on the treated centrate liquor stream in order to remove the insolubles resulting from such magnesium treatment before the treated centrate liquor is fed to the monohydrate crystallizer.

In some embodiments, the magnesium treatment may exclude adding a magnesium compound to the sodium carbonate monohydrate crystallizer for the purpose of removing water-soluble impurities such as silicates and/or foaming agents present in the crystallizer feed, such impurities being brought in from dissolved calcined trona and/or dissolved the reclaimed solid.

In some embodiments, the magnesium treatment may further include adding a magnesium compound to the trona calciner for the purpose of removing silicate impurities from the trona ore when dissolved and resulting in a calcined trona solution with a reduced silicates content. In other embodiments, the magnesium treatment excludes adding a magnesium compound to the trona calciner.

The aqueous solution may be an unsaturated sodium carbonate-containing solution comprising less than 20 percent sodium carbonate, or between 5 percent and 15 percent sodium carbonate. The unsaturated sodium carbonate-containing solution may be prepared, at least in part, from a source of sodium carbonate decahydrate. In some embodiments, the separating step may generate a weak liquor stream which provides at least a portion of this unsaturated aqueous sodium carbonate-containing solution. An unsaturated aqueous sodium carbonate-containing solution may be also obtained by recovering a crystalline sodium carbonate decahydrate solid formed in a tailings pond or a decahydrate crystallizer and by dissolving such reclaimed crystalline sodium carbonate decahydrate solid in at least a portion of the weak liquor which exits a thickener used in the separation process.

The aqueous solution may be a saturated or near-saturated sodium carbonate-containing solution comprising more than 20%, or more than 25% sodium carbonate. The saturated or near-saturated sodium carbonate-containing solution may be derived, at least in part, from dissolved reclaimed solid (such comprising sodium carbonate decahydrate) and/or dissolved calcined trona ore.

The reclaimed solid is preferably recovered from a tailings pond or from a crystallizer, such as a mechanical decahydrate crystallizer. A soda ash plant may comprise a mechanical decahydrate recovery system to allow recovery of at least a portion of a sodium carbonate decahydrate solid that would otherwise be deposited in a pond. Once the sodium carbonate decahydrate solid is excavated from the pond, this reclaimed 'deca' solid can be immediately recycled to the soda ash plant or it can be stored (e.g., in silos, tanks or piles) before being recycled.

The magnesium treatment may be carried out during dissolution of the reclaimed solid or afterwards.

The method may comprise performing one or more magnesium treatment steps by adding a magnesium compound to a saturated or near-saturated sodium carbonate-containing solution, by adding a magnesium compound to an unsaturated sodium carbonate-containing solution, or performing both. The magnesium compound used to treat a saturated or near-saturated sodium carbonate-containing solution may be the same or different than the magnesium compound used to treat an unsaturated sodium carbonate-containing solution.

When the method comprises performing a magnesium treatment step by adding a magnesium compound to a first sodium carbonate-containing solution, the method may further comprise performing a supplemental magnesium treatment step by adding a supplemental magnesium compound to a second sodium carbonate-containing solution, wherein the supplemental magnesium compound is the same or different than the magnesium compound used to treat the first aqueous sodium carbonate-containing solution. The first aqueous sodium carbonate-containing solution may be unsaturated, while the second sodium carbonate-containing solution may be saturated or near-saturated.

Another embodiment of the present invention covers a method of removing soluble silicates from an unsaturated aqueous sodium carbonate-containing solution comprising the soluble silicates as impurities, the method comprising the steps of: treating an unsaturated aqueous sodium carbonate-containing solution comprising a dissolved reclaimed solid containing water-soluble silicates, the unsaturated solution comprising less than 20% sodium carbonate, by adding a magnesium compound in a suitable amount and for a time sufficient to effect the precipitation of insoluble silicates and to form a treated solution; dissolving calcined trona with an aqueous medium comprising or consisting of at least a portion of the treated solution to form a saturated or near-saturated sodium carbonate-containing solution; passing the saturated or near-saturated sodium carbonate-containing solution though at least one separation unit to remove insoluble matter comprising precipitated insoluble silicates and to obtain a purified saturated or near-saturated sodium carbonate-containing solution, the separating step being effective in further providing a weak liquor stream which serves as at least a portion of the unsaturated aqueous sodium carbonate-containing solution; passing a crystallizer feed comprising the purified stream (at least a portion of which has been treated) through a crystallizer under crystallization promoting conditions suitable to form sodium carbonate monohydrate crystals; and drying the sodium carbonate monohydrate crystals to form a crystalline sodium carbonate product.

In any of or all of the embodiments of the present invention, the reclaimed solid is recovered from a tailings pond or at least one crystallizer.

In any of or all of the embodiments of the present invention, the reclaimed solid which is dissolved before reuse is recovered from a tailings pond. The tailings pond is generally operated under conditions suitable for making at least one sodium compound selected from the group consisting of sodium carbonate decahydrate, sodium carbonate monohydrate, sodium bicarbonate, sodium sesquicarbonate, sodium carbonate heptahydrate, and combinations of two or more thereof.

In any of or all of the embodiments of the present invention, the reclaimed solid comprises sodium carbonate decahydrate, and optionally a sodium compound selected from the group consisting of sodium carbonate monohydrate, sodium carbonate heptahydrate, sodium sesquicarbonate, sodium bicarbonate, and combinations thereof.

Another embodiment of the present invention covers a method of reducing foaming incidence in a sodium carbonate monohydrate crystallizer which is fed by a feed comprising a dissolved reclaimed solid. Such method comprises a treatment with magnesium by adding a magnesium compound to an aqueous sodium carbonate-containing solution. The aqueous sodium carbonate-containing solution contains the dissolved reclaimed solid. The reclaimed solid may have been recovered from a tailings pond or from a crystallizer, such as a mechanical decahydrate crystallizer. The reclaimed solid preferably comprises sodium carbonate decahydrate. The aqueous sodium carbonate-containing solution contains foam-causing agent(s) which may be brought in from the reclaimed solid and/or from calcined trona ore. The magnesium compound is added in a suitable amount and for a time sufficient to reduce the foaming propensity and/or the content of the foam-causing agent(s) in the treated solution (which provides, at least in part, the crystallizer feed). The foam-causing agent(s) may be organic compounds soluble in water. The treatment with the magnesium compound may be carried out on an unsaturated sodium carbonate-containing solution comprising less than 20 percent sodium carbonate; or may be carried out on a saturated or near-saturated sodium carbonate-containing solution comprising more than 20 percent sodium carbonate, or more than 25 percent.

In any of or all of the embodiments of the present invention, the magnesium treatment may be carried out at a single addition point upstream of the sodium carbonate monohydrate crystallizer, or may be carried out at two or more points upstream of such crystallizer.

In any of or all of the embodiments of the present invention, the addition of the magnesium compound is carried out with an effective amount of magnesium with respect to silicon present in the aqueous sodium-carbonate-containing solution which is being treated so as to form water-insoluble magnesium silicate. The effective amount may be in a stoichiometric or sub-stoichiometric or super-stoichiometric amount of magnesium with respect to the amount of silicate present in the aqueous sodium carbonate-containing solution.

In any of or all of the embodiments, the treatment with the magnesium compound may be carried out at a temperature between 20° C. and 90° C. The treatment with the magnesium compound should be carried out for at least 5 minutes, or may be carried out for at least 20 minutes. The treatment with the magnesium compound may be carried out in a manner effective to disperse the magnesium compound into the aqueous solution, such as with agitation.

In any of or all of the embodiments, the treatment with the magnesium compound may be effective in reducing Si content by at least 4%, or at least 10% or at least 15% or at least 20%. The treatment with the magnesium compound may be effective in reducing Si content by less than 100%, by 95% or less. For example, reduction in Si in the treated solution may vary from about 20% to about 95%.

In any of or all of the embodiments, the treatment with magnesium may be effective in achieving a content of 100 ppm Si or less, or 90 ppm Si or less, or 75 ppm Si or less, or even 50 ppm Si or less, in the liquor which is fed to a crystallizer and/or a reactor.

In any of or all of the embodiments of the present invention, the magnesium compound may comprise or consist essentially of one or more water-soluble magnesium salts, preferably comprises or consists essentially of magnesium chloride and/or sulfate. Alternatively, the magnesium compound may comprise or consist essentially of one or more water-insoluble magnesium compounds, such as comprising or consisting essentially of magnesium hydroxide, oxide, carbonate, and/or combinations thereof. Suitable (albeit not limiting) magnesium compounds include magnesium oxide, magnesium hydroxide, magnesium nitrate, magnesium sulfate, magnesium sulfite, magnesium sulfide, magnesium carbonate, magnesium chlorate, magnesium perchlorate, magnesium chloride, any anhydrous or hydrous form thereof, or any combinations of two or more thereof. Any of the preceding magnesium compounds may be excluded from this list. In some embodiments of the method, the magnesium compound may exclude magnesium oxide.

In some embodiments of the method, the treatment with the magnesium compound is preferably carried out with the magnesium compound at least partially dissolved or completely dissolved in water. More than one magnesium compound may be used in the magnesium treatment. When the magnesium treatment employs two or more magnesium compounds, at least one of the magnesium compounds is water-soluble and is dissolved in water when added during the magnesium treatment. When two or more magnesium compounds are used for the treatment, they may be used at the same addition point or may be used at two or more addition points.

The treatment with the magnesium compound may be carried out by adding at least one magnesium compound which is in dry particulate form or is dissolved, dispersed, or slurried in water.

In some embodiments, the method further comprises adding a hydroxide to at least one solution comprising sodium bicarbonate to convert at least a portion of the sodium bicarbonate to sodium carbonate. The sodium bicarbonate-containing solution may be selected from the group consisting of the waste being in liquid form, the aqueous medium or solution in which the waste is mixed or dissolved before it is being treated with magnesium (whether it be unsaturated or saturated or near-saturated in sodium carbonate), the treated solution, and the purified solution. In this manner, the feed to the first (monohydrate) crystallizer which comprises at least a portion of the purified sodium carbonate-containing solution contains less than the sodium bicarbonate saturation point at the monohydrate crystallizer operating temperature.

In some embodiments of a process for producing crystalline sodium sulfite, a method may include reacting at least a portion of the purified sodium carbonate-containing solution with sulfur dioxide to form a sodium sulfite stream; passing the sodium sulfite stream through a crystallizer under crystallization promoting conditions suitable to form crystals of sodium sulfite; and drying the crystals to form a crystalline sodium sulfite final product. The crystalline sodium sulfite final product preferably meets photo-grade specifications.

In alternate or additional embodiments of the present invention which produces crystalline sodium sulfite, the magnesium treatment may be carried out on an aqueous solution that comprises sodium sulfite before the sulfite crystallization, wherein the aqueous sodium sulfite-containing solution is being formed by reaction of an aqueous sodium carbonate-containing solution and sulfur dioxide. Or the magnesium treatment may be carried out before the reaction step, for example on the sodium carbonate-containing solution which serves as the reactant.

In yet alternate or additional embodiments of the present invention which produces crystalline sodium bicarbonate, sodium bicarbonate may be formed by reaction of a sodium carbonate-containing solution and carbon dioxide. The addition of the magnesium compound may be performed before the reaction step, for example by reacting at least a portion of the purified sodium carbonate-containing solution with carbon dioxide to form a sodium bicarbonate stream or by reacting a sodium carbonate-containing purge or mother liquor, a portion of which has been treated with magnesium and purified, with carbon dioxide to form a sodium bicarbonate stream.

Yet another embodiment of the present invention relates to a method for treating a sodium carbonate-containing solution with magnesium in a process which uses calcined trona and a reclaimed solid recovered from a tailings pond or a crystallizer, wherein the treated solution is further purified after the magnesium treatment to serve as a feedstock to a sodium carbonate monohydrate crystallizer or as a reactant to make sodium sulfite or bicarbonate. The treatment with magnesium is preferably effective in providing at least one of the following improvements or effects:

reducing the content in water-soluble impurities (e.g., silicates, organics) in the treated or purified solution;

reducing the fines content in the final product comprising crystalline sodium carbonate;

reducing the content in silicon and/or silicates in the crystals comprising sodium sulfite to make a photo-grade sodium sulfite final product;

reducing the content in silicates in the crystals comprising sodium bicarbonate;

reducing the incidence of scale formation in a crystallizer heat exchanger;

reducing the content of water-soluble organic foam-causing agents in the treated or purified solution;

reducing the incidence of foaming in at least one crystallizer (the sodium carbonate monohydrate crystallizer and/or the sodium bicarbonate crystallizer); and any combinations of two or more thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DEFINITIONS AND NOMENCLATURES

Figure 1:
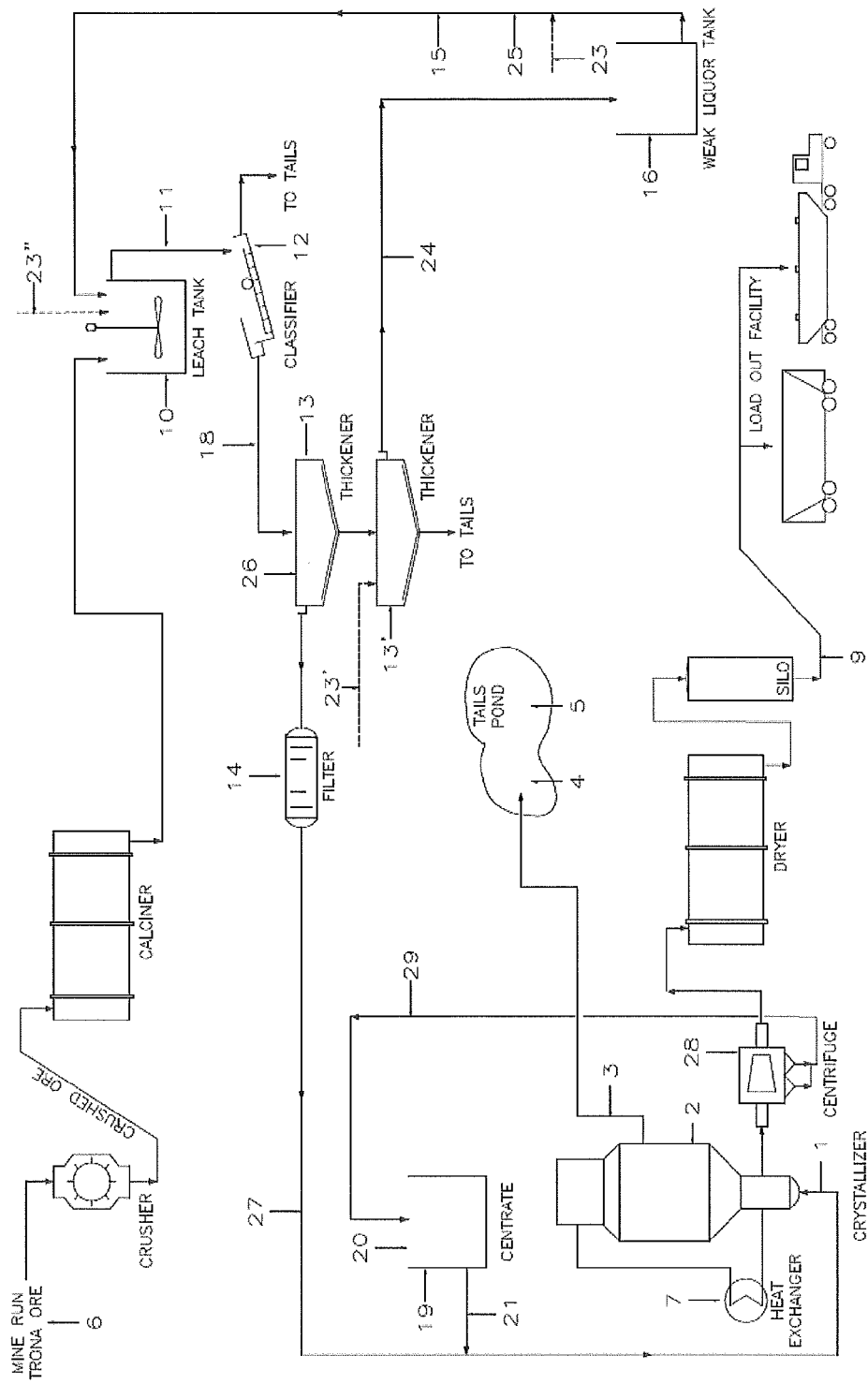
FIG. 1 illustrates a process flow diagram of a soda ash plant according to a first embodiment of the present invention.

For purposes of the present disclosure, certain terms are intended to have the following meanings.

The term "solubility" refers to the water solubility of a compound in an aqueous solution or liquor.

The terms "clear solution" or "purified solution" can be used interchangeably, and both refer to a solution which has gone through one or more separation units (classification, sedimentation and/or filtration) to decrease the content in solid. In the context of a sodium carbonate-containing solution, the clear or purified solution is saturated or near-saturated in sodium values (generally greater than 20% sodium carbonate). Generally, the clear or purified solution is obtained by passing through at least one filtration unit (e.g., through a 4.5-micron filer), but typically through a classification unit, a sedimentation unit, and then a filtration unit. The clear or purified solution is free or substantially free of solids (e.g., insolubles), i.e., generally contains about 100 ppm or less solids. The clear or purified solution may typically have an insoluble content from about 5 ppm to about 100 ppm. Measured values have been between 13 and 74 ppm. The clear or purified solution may have an average insoluble content from 25 to 60 ppm, typically from 30 to 50 ppm.

The terms "recovered solid" or "reclaimed solid" (e.g., recovered sodium carbonate decahydrate) can be used interchangeably, and both refer to a solid which is excavated from a tailings pond or recovered from a mechanical crystallizer (e.g., a decahydrate or bicarbonate crystallizer).

The terms "recovered deca" or "reclaimed deca" can be used interchangeably, and both refer to a solid comprising sodium carbonate decahydrate and which is excavated from a tailings pond or recovered from a mechanical decahydrate crystallizer.

The term "TA" or "Total Alkali" as used herein refers to the weight percent in solution of sodium carbonate and/or sodium bicarbonate (which latter is conventionally expressed in terms of its equivalent sodium carbonate content). For example, a solution containing 17 weight percent $Na_2CO_3$ and 4 weight percent $NaHCO_3$ would have a TA of 19.5 percent.

DETAILED DESCRIPTION OF THE PREFERRED EMBODIMENTS

Preferred embodiments of the present invention relate to a system and a process for the production of crystalline sodium carbonate, sodium bicarbonate, sodium sulfite, or combinations of two or more thereof, in which a magnesium treatment is carried out (preferably in solution) on a waste followed by a separation before the resulting treated and purified solution enters a crystallizer for the purpose of removing (at least partially) water-soluble impurities present in the waste. A source of such waste containing water-soluble impurities may be a reclaimed solid and/or a purge or weak liquor containing at least one sodium compound which is recycled to the process. An additional source of water-soluble impurities may be calcined trona ore which serves as one feedstock to a process which produces soda ash, sodium bicarbonate and/or sodium sulfite. The water-soluble impurities may be silicates and/or organic foam-causing agents.

One objective of the present invention is the removal of water-soluble impurities by a magnesium treatment performed on a sodium carbonate-containing solution, in order for this treated sodium carbonate-containing solution to be used after purification (for removal of insolubles) as feedstock to a crystallizer and/or as a reactant in order to make one or more crystalline products comprising sodium carbonate or sodium sulfite or sodium bicarbonate.

Another objective of the present invention is the removal of water-soluble impurities by a magnesium treatment performed on a solution containing sodium carbonate, sodium sulfite, or sodium bicarbonate, in order for the treated solution to be used after purification (for removal of insolubles) as feedstock to a crystallizer and/or as a reactant in order to make a crystalline product comprising sodium carbonate, sodium sulfite, or sodium bicarbonate.

The invention will now be described with reference to the drawings.

FIG. 1 illustrates a block process flow diagram of a plant for producing crystalline sodium carbonate from trona ore, also known as a soda ash plant.

In the production of soda ash, trona ore 6 is crushed and calcined in a calciner 8. The calcined product has a final temperature of from about 257° F. to 482° F. (or from 125° C. to 250° C.), or from about 300° F. to 375° F. (or from 150° C. to 190° C.), or about 300-330° F. (150-166° C.) at the exit of the calciner 8 (also known as 'spill' temperature). The calcination operating conditions should be effective in decomposing the sodium sesquicarbonate to sodium carbonate. During calcination, a part of the silicon-containing impurities contained in the trona ore is converted to silicates which are water-soluble. The content of bicarbonate in the resulting calcined product is also impacted by the calcination conditions, that is to say, the greater the temperature and residence time (and hence the calcination completion), the lower the amount of sodium bicarbonate present in the resulting calcined product. One of the advantages of the trona calcination is that calcined trona dissolves faster than raw trona. Another advantage is that calcined trona can produce more concentrated sodium carbonate-containing solutions, whose concentrations can reach about 30%, while dissolved raw trona results into solutions having only about 16% sodium carbonate plus 10% sodium bicarbonate.

The calcined trona ore is then dissolved in water or in a dilute liquor (e.g., a weak liquor stream 15 exiting a weak liquor tank 16, which will be described later) inside a leach tank 10 to give a saturated or near-saturated solution or liquor 11 of about 30% $Na_2CO_3$ and containing soluble impurities, which include silicates, organics, chlorides, and sulfates. Hereinafter, liquor 11 may be referred to as a saturated or near-saturated solution 11. Indeed, silicates present in the trona ore increase in solubility during the calcination step in the calciner 8. The dissolution of calcined trona in the leach tank 10 generally takes place at a temperature between 170° F. and 200° F. (or between 77.5 and 93° C.). The dissolution is generally carried out under atmospheric pressure. The residence time in the leach tank 10 is generally at least 15 minutes, and can be as high as 60 minutes. Although only one leach tank 10 is illustrated in FIG. 1, for practicality, the leach tank 10 may comprise two or more vessels operated in series in which several stages of dissolution take place and/or operated in parallel. That is to say, in the most upstream vessel, only partial dissolution of calcined trona takes place, while in the most downstream vessel, the dissolution of sodium carbonate is completed to form the saturated or near-saturated solution 11.

The water or aqueous medium in which the calcined trona is dissolved in the leach tank 10 can be fresh water. However the water or aqueous medium for calcined trona dissolution can contain one or more recycled aqueous solutions already containing alkalis, coming from the soda ash process or from other processes. The water or aqueous medium may comprise mother liquors (crystallization waters) produced downstream of the process, when sodium carbonate, sodium decahydrate, and/or sodium bicarbonate are crystallized, for instance. The water or aqueous medium may comprise a mine water. By mine water is understood the water solution which is formed when water is directly injected into a trona ore deposit, whereby, on contact with the water, some ore dissolves in the water to form the mine water. The dissolution of calcined trona in the leach tank 10 generally takes place with at least a weak liquor stream 15.

The saturated or near-saturated solution or liquor 11 obtained after the dissolution of calcined trona and exiting the leach tank 10 is typically purified. The purification generally involves settling and filtration steps, to remove the water-insoluble impurities which are coming from the trona ore. A classifier is generally the first stage of solids removal. It removes the large solids that settle quickly. A thickener is used next and has a much longer residence time and removes smaller solids with the aid of a flocculent. One or more filters finish the purification by removing the very small solids that do not settle in either the classifier or thickener. The purification may also involve the use of reagents to facilitate settling and/or to remove organic matters still contained in the purified solution. Activated carbon and/or flocculent are examples of such reagents.

The saturated or near-saturated solution 11 exiting the leach tank 10 is preferably passed through a classifier 12 where large-size insoluble matter is removed and sent to a secondary dissolver and then to tails, and a classifier overflow 18 exits the classifier 12. The classification of the saturated or near-saturated solution 11 generally takes place at a temperature between 170° F. and 190° F. (77-88° C.) and under atmospheric pressure.

The classifier overflow 18 is fed to a first thickener 13 in a series of two or more thickening stages. In the first thickener 13, settling of smaller-size insoluble matter takes place, this settling generally being facilitated by flocculent addition. The thickener 13 generally operates at a temperature between 160° F. and 180° F. (71-82° C.) and atmospheric pressure. The residence time in the thickener 13 is generally at least 12 hours, more preferably between 18 and 24 hours.

Referring to a subsequent thickening stage, the insoluble matter at the bottom of the thickener 13 is sent to another thickener 13' to dilute the sodium carbonate-containing solution used to transport the insolubles to tails. The separation by settling generates an insoluble stream which is disposed of and a supernatant 24 which is sent to a weak liquor tank 16. This supernatant 24 is an unsaturated sodium carbonate-containing solution which contains less than 20% sodium carbonate. The sodium carbonate content in the supernatant 24 may vary between 3 and 15%, but generally is between 5 and 15%, or even between 5 and 10%, or even between 3 and 5%. A weak liquor stream 15 exiting the weak liquor tank 16 is fed back to the leach tank 10 to provide at least a portion of (or all of) the aqueous medium in which the calcined trona is dissolved in the leach tank 10.

The weak liquor tank 16 is basically a holding tank for providing a constant flow of the weak liquor stream 15 to the leach tank 10. The temperature in the weak liquor tank 16 is generally between 110° F. and 160° F. (between 43.3 and 71° C.), or preferably between 120° F. and 155° F. (between 48.9 and 68.3° C.); or more preferably between 150° F. and 160° F. (between 66 and 71° C.). The operating pressure in the weak liquor tank 16 is generally atmospheric. The residence time of the unsaturated liquor in the weak liquor tank 16 is generally at least 10 minutes, typically about 180 minutes.

The weak liquor stream 15 is not saturated in sodium carbonate and generally contains less than 20% sodium carbonate. The weak liquor stream 15 may contain from 3% to 15% sodium carbonate, or may contain from 5% to 10% sodium carbonate; or may contain from 6% to 9% sodium carbonate. The TA content of such stream 15 is generally between 3 and 10% TA, preferably about 4-7% TA, or about 5-6% TA.

Referring back to the operation of the first thickener 13, even though the majority of insoluble matter has been removed from the saturated or near-saturated soda ash solution in the classifier 12 and the thickener 13, there is still some very small insoluble matter that needs to be removed. The overflow of the thickener 13 is thus passed through a filtration unit 14 to create a purified saturated or near-saturated sodium carbonate-containing solution which exits the filtration unit 14 as filtrate 27.

Before the solution is passed through the filtration unit 14, the solution (e.g., overflow of the thickener 13) may be contacted with activated carbon to remove some of the organics present in the solution.

Figure 4:
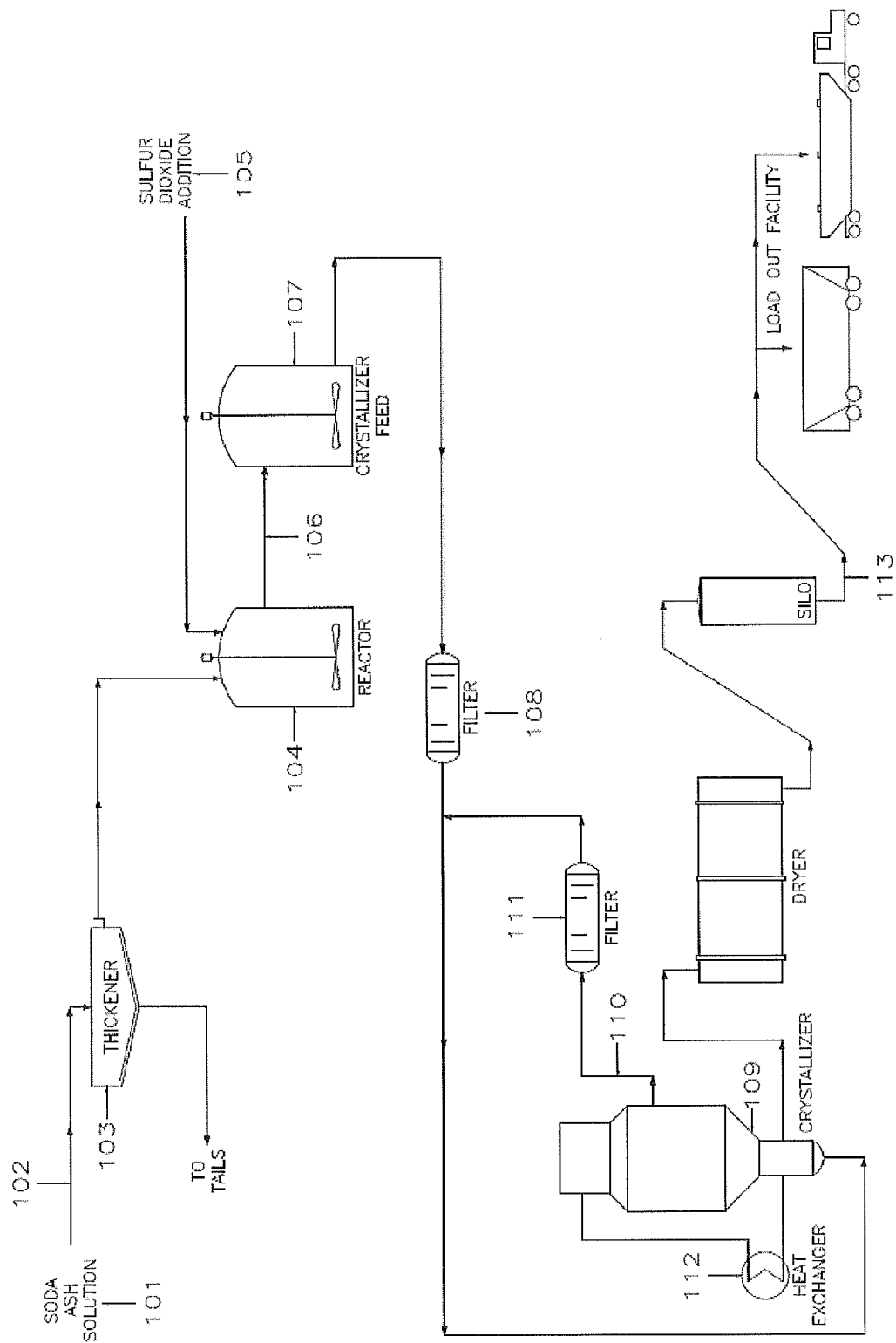
FIG. 4 illustrates a process flow diagram of a sodium sulfite plant according to a fourth embodiment of the present invention.

Although not illustrated in FIG. 1, a portion of the purified solution (filtrate 27) may serve as a reactant to a process for the production of sodium bicarbonate by reaction with carbon dioxide, or to a process for the production of sodium sulfite by reaction with sulfur dioxide which is illustrated in FIG. 4.

Referring back to the production of sodium carbonate as illustrated in FIG. 1, the filtrate 27 (purified solution) serves as at least a part of the crystallizer feed 1 to a crystallizer 2 (typically an evaporative crystallizer).

The crystallizer 2 into which the purified saturated or near-saturated solution is introduced must be able to crystallize sodium carbonate. The crystallized sodium carbonate can be in different hydration forms: monohydrate, decahydrate, heptahydrate, or can be anhydrous.

In preferred embodiments, the sodium carbonate crystals produced in the crystallizer 2 are in the monohydrate form. The crystallizer 2 is then part of what is commonly referred to as the "monohydrate process". As the saturated or near-saturated solution is heated in the crystallizer 2, evaporation of water takes place effecting the crystallization of sodium carbonate into sodium carbonate monohydrate crystals ($Na_2CO_3.H_2O$). Typical temperature in the crystallizer 2 may be from 160° F. to 230° F. (or from 71 to 110° C.).

The monohydrate crystals are removed from the mother liquor by a centrifugal separator 28 and then dried in a dryer to convert it to anhydrous soda ash product 9, which is stored in silos and loaded into railroad cars or shipping containers for delivery to customers.

A liquor stream is recycled to the crystallizer 2 via a recirculation loop comprising a crystallizer heat exchanger 7 for further processing into sodium carbonate monohydrate crystals. While passing through the crystallizer heat exchanger 7, the temperature of the mother liquor is increased.

Figure 3:
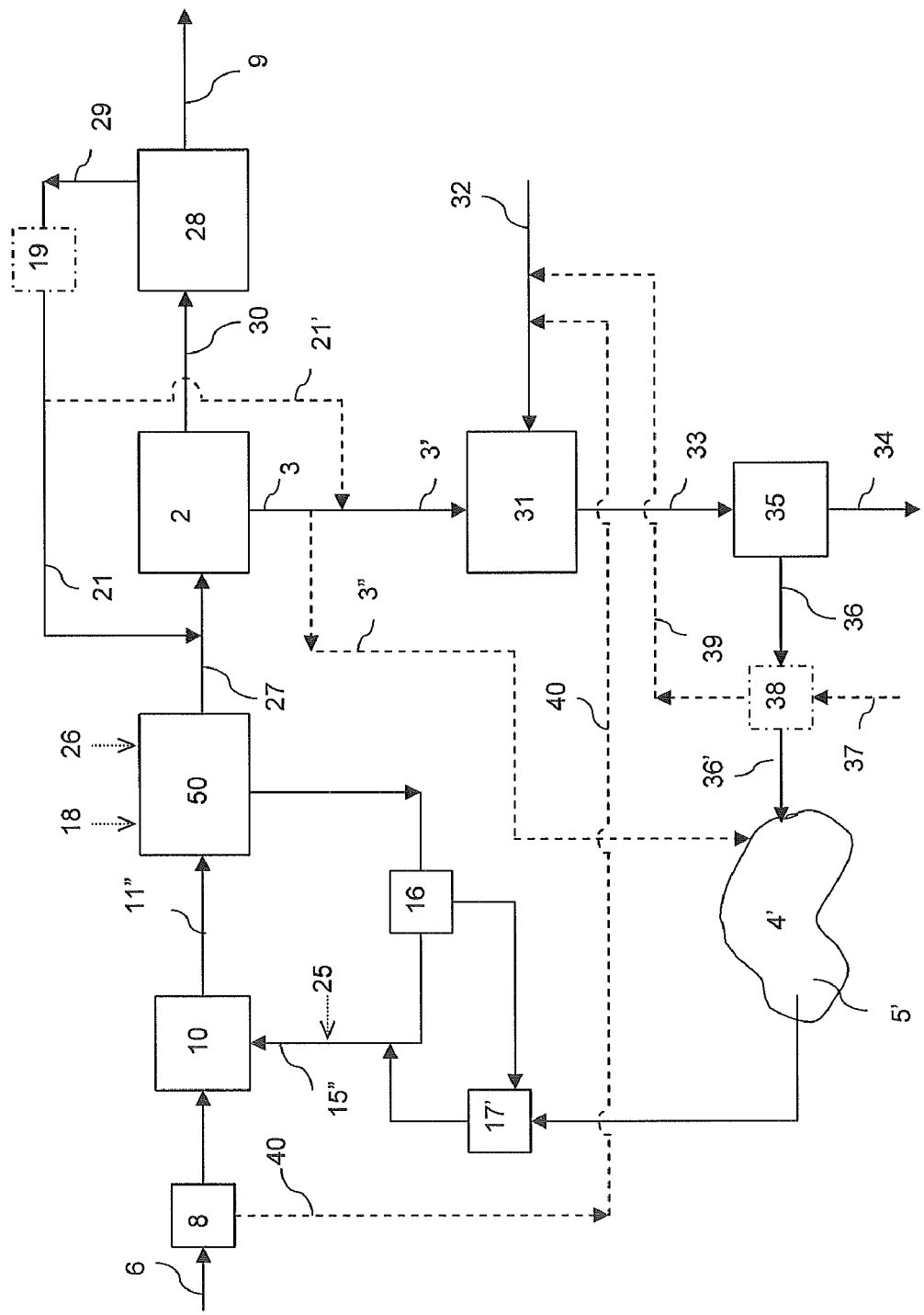
FIG. 3 illustrates a process flow diagram of a process which co-produced sodium carbonate and bicarbonate according to a third embodiment of the present invention, such process recycling a reclaimed solid which is recovered from a deposit in a tailings pond.

To avoid contamination and deterioration of crystal shape and hardness by the impurities, such as silicate, as well as to prevent the buildup of these impurities in the crystallizer and to minimize scale formation on the heat exchanger surfaces exposed to the mother liquor, a portion of the crystallizer liquor must be purged. A purge liquor stream 3 is withdrawn from the crystallizer 2. The TA content of such purge liquor stream 3 is generally between 25 and 31% TA depending upon the levels of soluble impurities entering the system. The purge liquor stream 3 is diverted to a tailings pond 4 (as shown in FIG. 1) or a mechanical sodium carbonate decahydrate recovery system (not shown), or directed to a bicarbonate process as illustrated in FIG. 3.

Referring back to FIG. 1, a mother liquor containing sodium carbonate monohydrate crystals and water-soluble impurities (including silicate) is withdrawn from the crystallizer 2 and may be sent to the centrifugal separator 28 to collect monohydrate crystals, while a centrate stream 29 is sent to a centrate tank 19. The centrate tank 19 not only can serve as a surge tank for the recycling of the centrate but also can serve as a vessel for optional treatment(s) 20 of the centrate, such as a magnesium treatment for removal of soluble silicates, or a pH adjustment for removal of sodium bicarbonate, or the sequential or simultaneous use of these treatments (which will be described in more detail later). If a magnesium treatment includes adding the magnesium compound to the centrate liquor, a separation step (such as filtration) may be performed on the treated centrate liquor stream in order to remove the insolubles resulting from such treatment before the treated centrate liquor (e.g., optionally-treated centrate liquor 21) is fed to the crystallizer.

The optionally-treated centrate liquor stream 21 exiting the centrate tank 19 is fed to the crystallizer 2, either combined with the filtrate 27 exiting the filtration unit 14 to form the crystallizer feed 1 (as shown) or separately fed to the crystallizer 2 (not shown).

According to a first embodiment of the present invention carried out in FIG. 1, a treatment with at least one magnesium compound may be carried out on an unsaturated sodium carbonate-containing solution. For example, an amount of reagent comprising or consisting essentially of a magnesium compound may be added to the weak liquor to effect the removal of water-soluble silicon-containing impurities. The addition of magnesium-containing reagent may be carried out in the weak liquor tank 16, in weak liquor 15 (e.g., addition point 25), or at any location (such as at addition points 18 or 25) in between the exit point of the supernatant 24 exiting the secondary thickener 13' and the leach tank 10. The location of the magnesium compound addition is chosen so as to provide sufficient amount of time to allow the desired silicate removal in the treated solution by formation of insoluble silicates. The time necessary for formation of precipitate should be at a minimum of 5 minutes, but preferably at least 20 minutes, more preferably between 20 and 60 minutes, but can be as long as 24 hours. Since the weak liquor stream 15 is fed to the leach tank 10 where the calcined trona is dissolved, magnesium may be added in a stoichiometric amount with respect to the formation of magnesium silicate not only based on the silicate content present in the weak liquor but also based on the silicate content in the calcined trona being fed to the leach tank 10. Alternatively, the magnesium compound can be added in a sub-stoichiometric or super-stoichiometric amount, so as to achieve the desired removal of the soluble silicates present in the solution contained in the leach tank 10. If there is still magnesium remaining in forms other than silicate in the weak liquor stream 15 which is carried over in the leach tank 10, there can be additional removal of soluble silicates from the calcined trona being dissolved in the leach tank 10, for example by a subsequent conversion of magnesium compounds more water-soluble than magnesium silicate.

According to a second embodiment carried out in FIG. 1, an alternate or additional treatment with a magnesium compound may be carried out on a saturated or near-saturated sodium carbonate-containing solution. As an example, an amount of reagent comprising or consisting essentially of a magnesium compound is added to the dissolved calcined trona to form a silicate precipitate effecting the removal of some water-soluble silicon-containing impurities.

The addition may be carried out in the leach tank 10, in the classifier 12, in the classifier overflow (e.g., point 18), in the primary thickener 13 (e.g., addition point 26), in the secondary thickener 13', or at any location in between the leach tank 10 and the primary thickener 13. The location of the magnesium addition is chosen so as to provide sufficient amount of time for the formation of insoluble magnesium silicate. The time sufficient for precipitate formation should be at a minimum of 5 minutes, but preferably at least 20 minutes, more preferably between 20 and 60 minutes, but can be as long as 24 hours.

In the process carried out in the system illustrated in FIG. 1, the weak or purge liquor which contains sodium values may be treated for reuse at one or more locations in the process in order to valorize this liquor instead of disposing it as a waste. The weak or purge liquor may comprise water-soluble impurities being selected from the group consisting of silicates, organic foam-causing agents, and combinations thereof, and may comprise one sodium compound selected from the group consisting of sodium carbonate, sodium bicarbonate, and any combinations of two or more thereof.

In the process carried out in the system illustrated in FIG. 1, optionally a reclaimed solid which contains sodium values may be added at one or more locations in the process in order to valorize this solid instead of disposing it as a waste. The reclaimed solid may comprise water-soluble impurities being selected from the group consisting of silicates, organic foam-causing agents, and combinations thereof, and may comprise one sodium compound selected from the group consisting of sodium carbonate decahydrate, sodium carbonate monohydrate, sodium carbonate heptahydrate, sodium bicarbonate, sodium sesquicarbonate, and any combinations of two or more thereof.

The reclaimed solid is preferably added in dissolved form such as dissolved in water or in an aqueous solution comprising alkali values (such as a weak liquor). When a reclaimed solid is recycled to the soda ash plant, it may be added at any point in the soda ash plant, preferably a location which is located upstream of the filtration unit 14. It may be added to a solution unsaturated, saturated, or near-saturated in sodium carbonate, such as added to the weak liquor stream 15 (e.g., at addition point 23), to the weak liquor tank, or to the secondary thickener 13' (e.g., at addition point 23'), or may be added to the primary thickener 13, classifier 12 or its overflow 18, or to the leach tank 10 (e.g., at addition point 23"). The reclaimed solid is generally recovered from a tailings pond (such as pond 4) or a crystallizer, preferably other than the monohydrate crystallizer 2.

Figure 2:
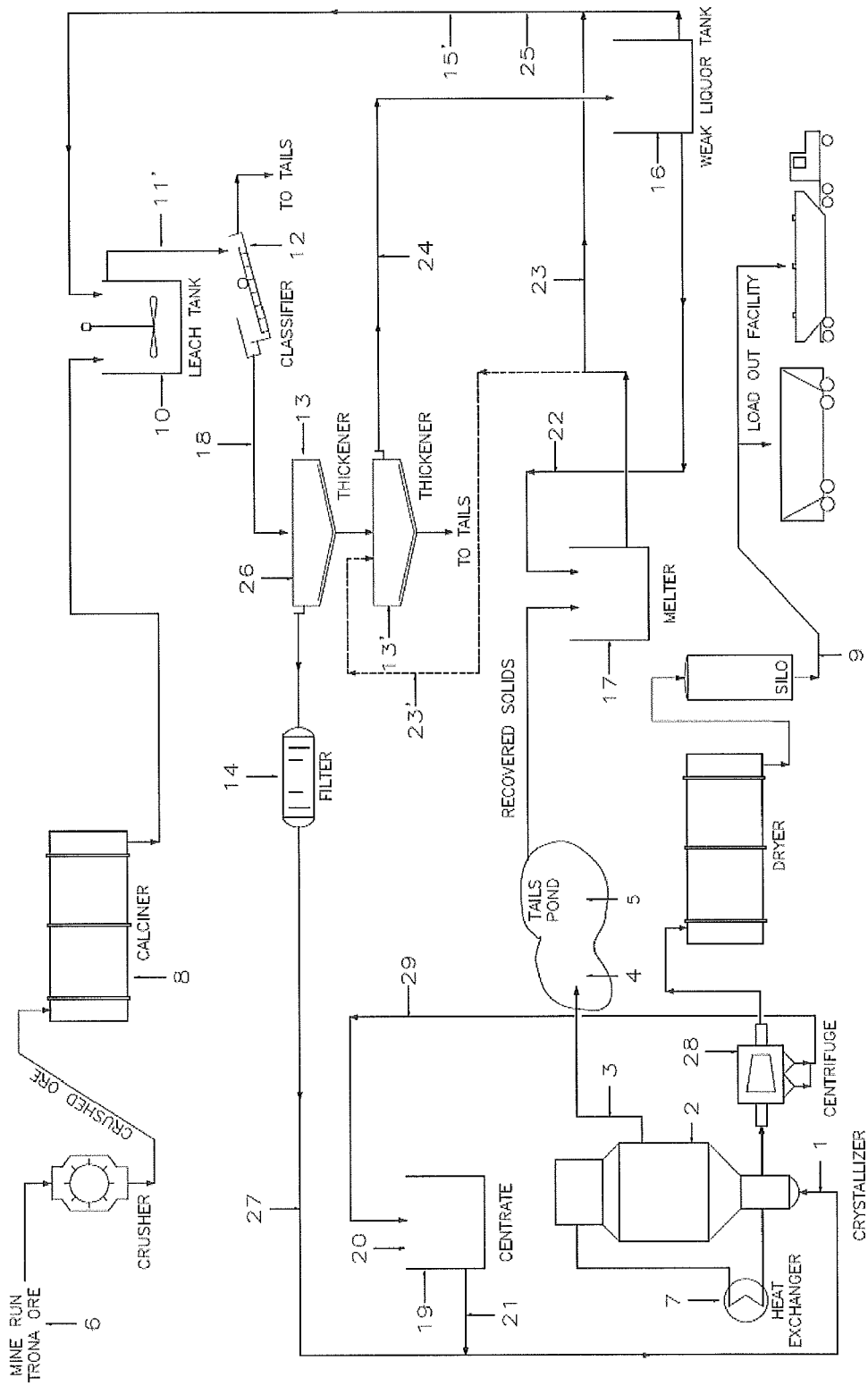
FIG. 2 illustrates a process flow diagram of a soda ash plant according to a second embodiment of the present invention with reclamation of sodium carbonate decahydrate deposited in and collected from a tailings pond.

FIG. 2 illustrates another embodiment of the present invention. The operation of trona calcination in calciner 8, dissolution of calcined trona in leach tank 10, separation of insolubles from saturated or near-saturated solution in classifier 12, thickeners 13 and 13', and filtration unit 14, crystallization in crystallizer 2, recirculation of liquor through heat exchanger 7, withdrawal and separation of the centrate 29 using centrifuge 28, and withdrawal of purge liquor 3 in the soda ash plant of FIG. 2 proceeds as previously described for FIG. 1.

The process carried out in the soda ash plant of FIG. 2 differs from that of FIG. 1 in that the sodium carbonate production process further comprises the recycling of a reclaimed solid which is recovered from a sodium carbonate decahydrate crystalline deposit 5 which is formed in the tailings pond 4. Indeed, the purge liquor (via stream 3) sent to the tailings pond 4 evaporates and/or cools resulting in the crystallization of sodium carbonate decahydrate contaminated with varying amounts of impurities. At least a portion of this sodium carbonate decahydrate deposit 5 (also called 'deca' deposit) is excavated and collected for further processing in the soda ash plant. The 'deca' deposit includes but is not limited to, silicates, organic foam-causing agent(s) and may also contain from 0.1% up to 10% sodium bicarbonate.

The reclamation of this 'deca' deposit has several advantages: 1) reduction of the volume of the tailings pond 4 occupied by this deposit, thus postponing the need for an expensive lift to the dam or building another tailings pond, 2) increase in the trona mine life by reducing the equivalent amount of trona ore required for sodium carbonate production; and 3) reduction in the cost of sodium carbonate production, as this sodium carbonate decahydrate reclamation is cheaper than mining trona ore.

The recovered 'deca' solid is first sent to a dissolver 17. A portion 22 of a weak liquor from the weak liquor tank 16 may provide the aqueous medium for the dissolution of sodium carbonate decahydrate in the dissolver 17. Sodium carbonate decahydrate generally dissolves faster in solution when it is heated. Since the dissolution of 'deca' in water is endothermic, the need for heat is provided by the portion 22 of weak liquor entering dissolver 17 since the weak liquor in tank 16 is at a higher temperature than the dissolver temperature. The temperature in the dissolver 17 is generally between 90° F. and 120° F. (32.2-48.9° C.), or greater than 100° F. (37.8° C.). The operating pressure in the dissolver 17 is generally atmospheric. The residence time of the sodium carbonate decahydrate in the dissolver 17 is generally at least 10 minutes, and can be up to 60 minutes. The weak liquor tank 16 or a secondary thickener (such as illustrated second thickener 13') serves as a holding tank for a weak liquor stream 15'. The weak liquor stream 15' is fed to the leach tank 10 as previously described for weak liquor stream 15 of FIG. 1.

A portion or all of dissolved sodium carbonate decahydrate (stream 23) exiting the dissolver 17 may be sent as a solution to the weak liquor stream 15' exiting the weak liquor tank 16 (as shown) or may be directed to the weak liquor tank 16 (not shown). Because sodium carbonate from the decahydrate dissolver 17 is fed to the weak liquor stream 15' (exiting the weak liquor tank 16) or fed to weak liquor tank 16, the TA content of such stream 15' increases from the typical ~6% (in stream 15) to generally between 8 and 15%, preferably about 11-13% TA. If the addition of the magnesium compound is carried out on weak liquor stream 15', it is recommended, albeit not required, that the stream 23 comprising dissolved 'deca' (exiting the dissolver 17) be added to the weak liquor stream 15' at an addition point upstream of the magnesium addition point 25 (as illustrated in FIG. 2). The stream 23 comprising dissolved 'deca' may be added to the weak liquor stream 15' at an addition point downstream of the magnesium addition point 25.

Alternatively or additionally, a portion or all of the dissolved sodium carbonate decahydrate (stream 23') exiting the dissolver 17 may be sent to a thickener (such as second thickener 13' in the series of thickeners) as illustrated by a dashed line in FIG. 2.

The weak liquor stream 15' sent to the leach tank 10 also serves to dissolve the crushed calcined trona to form the saturated or near-saturated solution or liquor 11'. The saturated or near-saturated solution or liquor 11' obtained after the dissolution of calcined trona and exiting the leach tank 10 is typically purified. Hereinafter, liquor 11' may be referred to as a saturated or near-saturated solution 11'. The purification generally involves settling and filtration steps to remove water-insoluble impurities. Water-insoluble matter in solution 11' may be coming from the calcined trona ore and may result from the magnesium treatment which creates water-insoluble precipitates and/or complexes. The purification may also involve the use of reagents to facilitate settling and/or to remove organic matters still contained in the purified solution. Activated carbon and/or flocculants are examples of such reagents.

As illustrated in FIG. 2, the saturated or near-saturated solution or liquor 11' is typically fed to the following separations units: classifier, 12, thickeners (including primary thickener 13 and secondary thickener 13' being operated in series) and filtration unit 14, as previously described for FIG. 1. The solution (liquor) 11' of FIG. 2 differs from solution 11 of FIG. 1 in that the saturated or near-saturated sodium carbonate-containing solution 11' contains a dissolved reclaimed solid comprising sodium carbonate decahydrate recovered from the pond deposit 5, while the saturated or near-saturated sodium carbonate-containing solution 11 of FIG. 1 may not contain a dissolved reclaimed solid or may contain a dissolved reclaimed solid comprising one sodium compound selected from the group consisting of sodium carbonate decahydrate, sodium carbonate monohydrate, sodium carbonate heptahydrate, sodium bicarbonate, sodium sesquicarbonate, and any combinations of two or more thereof, the reclaimed solid being recovered from a pond or a crystallizer, preferably other than the monohydrate crystallizer.

The fraction of sodium carbonate from dissolved reclaimed decahydrate solid in the solution (liquor) 11' may be from 1 to about 15%, may be from 1 to 10%, or may be 10% or more, with the remainder coming from dissolved calcined trona. Because the reclaimed sodium carbonate decahydrate solid may contain several folds higher amount of water-soluble silicates and sodium bicarbonate than a calcined trona (e.g., up to 10 times higher in ppm Si), even a small fraction of the dissolved reclaimed solid comprising sodium carbonate decahydrate in the solution 11' may yield a significant increase in the water-soluble silicates content of the solution 11'. Thus the greater the fraction of sodium carbonate from the reclaimed decahydrate solid in the solution 11', the greater the amount of magnesium compound needed to remove the silicate impurities brought in from the reclaimed 'deca' solid.

In instances when the reclaimed decahydrate solid contains a higher amount of soluble sodium bicarbonate than the calcined trona, the added reclaimed decahydrate solid dissolved in the saturated or near-saturated solution 11' may increase the content of sodium bicarbonate in the solution 11'. As the fraction of sodium carbonate from reclaimed decahydrate solid in the solution 11' is increased, converting the sodium bicarbonate to sodium carbonate may require a greater amount of hydroxide (e.g., sodium hydroxide).

Additionally, the reclaimed decahydrate solid may contain organic impurities such as those with foam-causing propensity which may be absent or present at a much lower level in the solution 11 in FIG. 1, the greater the fraction of reclaimed decahydrate solid in the solution 11', the greater the amount of magnesium compound needed to form precipitates or complexes with these foam-causing organic impurities brought from the reclaimed decahydrate solid.

For this reason, the magnesium treatment method as carried out in FIG. 2 preferably comprises adding the magnesium compound to an aqueous unsaturated sodium carbonate-containing solution (with less than 20% sodium carbonate, or preferably between 3 and 15% sodium carbonate), such as in the dissolver 17 (where sodium carbonate decahydrate is being melted and/or dissolved), in the weak liquor stream 15', and/or in the weak liquor tank 16, where the concentration of sodium carbonate is not near or at saturation, or below 20%, or below 15%, or between 3 and 15% sodium carbonate, preferably between 5 and 10% sodium carbonate. Since the weak liquor tank 16 is generally maintained at a higher temperature than the dissolver 17, the treatment with magnesium compound is preferably performed in the weak liquor tank 16 or in the weak liquor stream 15' exiting tank 16. The magnesium compound which has not directly reacted with silicates may form magnesium carbonates which may later react with the soluble silicates to form magnesium precipitates and sodium carbonates. If any of the magnesium compound is left unreacted with silicates in the weak liquor tank 16, it could be carried over in the portion 22 of the treated weak liquor stream exiting tank 16 which is fed to the dissolver 17.

An alternate or supplemental magnesium treatment may be carried out in FIG. 2 on a saturated or near-saturated solution which comprises dissolved calcined trona, e.g., during dissolution of the calcined trona in the leach tank 10, solution 11', or during the insolubles separation in the classifier overflow 18 or in the primary thickener 13, or after the insolubles separation on the centrate liquor (e.g., in the centrate tank 19) to convert soluble silicates to insoluble silicates.

Yet an alternate or additional embodiment of the magnesium treatment which may be carried out (not illustrated in FIG. 2) may include adding the magnesium compound (e.g., in solid form) to the reclaimed solid comprising sodium carbonate decahydrate recovered from the pond deposit 5. For example, the magnesium compound (e.g., in powder form) may be mixed with powdered recovered 'deca' before the mixture is fed to the dissolver 17.

Yet another alternate or additional embodiment of the magnesium treatment which may be carried out (not illustrated in FIG. 2) may include adding the magnesium compound in the second thickener 13' which is fed by the portion 23' comprising dissolved deca solid exiting the dissolver 17. For example, the magnesium compound (e.g., in dissolved or slurried or dispersed or suspended form) may be mixed with portion 23' comprising dissolved deca solid before portion 23' enters the secondary thickener 13' or may be added separately to the secondary thickener 13'.

Even though FIG. 2 is described for the production of soda ash with the recycling of a reclaimed 'deca' solid from the pond 4, it is envisioned that this magnesium treatment and recycling of such reclaimed solid may be performed in a process which produces sodium bicarbonate, in which the tailings pond 4 may be operated under conditions favorable for the crystallization of sodium bicarbonate and/or sodium sesquicarbonate. In this instance, the solid deposit formed in the pond may comprise solid sodium bicarbonate and/or sodium sesquicarbonate, and this solid deposit would also contain water-soluble silicates and/or organic impurities. When at least a part of such deposit is excavated and recycled to the sodium bicarbonate process and/or to a sodium carbonate process, the magnesium treatment according to the present invention may be carried out on an unsaturated or saturated/near-saturated solution as described previously in order to reduce the silicates content, reducing the scaling of a crystallizer heat exchanger, and/or the foaming propensity of at least one of the sodium carbonate and bicarbonate crystallizers. The difference is that the addition of magnesium would be performed on an aqueous solution comprising a dissolved reclaimed solid, the reclaimed solid comprising sodium bicarbonate and/or sodium sesquicarbonate.

An example of a process for producing sodium bicarbonate can be found in US PreGrant Published Patent Application US 2009/0291038 by Davoine et al. which is incorporated herein by reference.

Another example of a process in which crystalline sodium carbonate and bicarbonate are co-produced is shown in FIG. 3 which illustrates yet another embodiment of the present invention. The operation of trona calcination in calciner 8, dissolution of calcined trona in leach tank 10, separation of insolubles from saturated or near-saturated solution in the separation system (such as units 12, 13', 14), operation in the monohydrate crystallization system (crystallization in crystallizer 2, recirculation of liquor through heat exchanger 7, withdrawal and separation of the centrate 29 using centrifuge 28 of FIG. 2) proceeds as previously described for FIGS. 1 and 2.

The process carried out in the soda ash plant of FIG. 3 differs however from that of FIG. 2 in that at least a part of the purge liquor 3 (instead of being sent to the pond 4) is sent to a bicarbonate process and optionally a part of the mother liquor 29 or centrate liquor 21 may be sent to the same bicarbonate process instead of being recycled to the crystallizer 2. FIG. 3 further comprises the creation of a second purge liquor exiting the bicarbonate process which is sent to the tailings pond 4. There is formation of a new solid deposit 5' in that pond. At least a portion of this deposit 5' is excavated and reclaimed for further processing in the co-production plant. The reclaimed solid may contain water-soluble impurities being selected from the group consisting of silicates, organic foam-causing agents, and combinations thereof. This reclaimed solid also contain one sodium compound selected from the group consisting of sodium carbonate decahydrate, sodium carbonate monohydrate, sodium carbonate heptahydrate, sodium bicarbonate, sodium sesquicarbonate, and any combinations of two or more thereof. The purge liquor 3 and/or the second purge liquor (or portions thereof) may be subjected to the magnesium treatment before being reused in the process which produces sodium bicarbonate.

As illustrated in FIG. 3, trona ore 6 is crushed and calcined in the calciner 8. Crushed calcined trona and a weak liquor stream 15'' are introduced in the leaching tank 10. The resulting water solution or liquor 11'' containing insolubles in suspension is purified in at least one separation unit 50 to form the purified aqueous solution 27. Separation unit 50 may include a classifier, a thickener, and/or a filtration system, such as classifier 12, thickeners 13 and 13', and filter 14 which were previously described in the context of FIG. 1 and FIG. 2.

The crystallizer feed 1 comprising the purified aqueous solution 27 and at least a centrate portion 21 of a recycled mother liquor 29 is introduced into the monohydrate crystallizer 2, wherein a suspension 30 containing sodium carbonate monohydrate crystals is produced. A crystalline final product 9 containing these monohydrate crystals is separated from the suspension 30 in a separator (such as centrifuge 28 previously described in the context of FIG. 1 and FIG. 2), while at least a centrate portion 21 of the resulting mother liquor 29 is sent back to the crystallizer 2. In some embodiments, portion 21' of the mother liquor 29 from the monohydrate process which is not recycled to the crystallizer 2 can be sent to a reactor 31 where sodium bicarbonate is formed by reaction of sodium carbonate with $CO_2$.

A second crystallizer feed 3' comprising the purge stream 3 exiting from the crystallizer 1 and/or a portion 21' of the mother liquor 29 is fed to a reactor 31, and the sodium carbonate present in the second crystallizer feed 3' is reacted with $CO_2$ to form sodium bicarbonate which is crystallized. In some embodiments, the second crystallizer feed 3' comprising sodium carbonate comprises at least 175 g/kg of sodium carbonate, and the carbon dioxide feedstock 32 comprises at least 90% $CO_2$. The $CO_2$ feed to the reactor 31 may be from a carbon dioxide feedstock 32 and/or from $CO_2$-containing effluents 39 and 40 (described later) generated in the co-production plant.

The second crystallizer feed 3' may consist essentially of the purge stream 3 exiting from the crystallizer 1, or may consist essentially of the portion 21' of the mother liquor 29. The second crystallizer feed 3' may contain at least 175 g/kg, preferably at least 190 g/kg, more preferably at least 205 g/kg, most preferably at least 220 g/kg of sodium carbonate. The second crystallizer feed 3' may contain not more than 250 g/kg, preferably not more than 240 g/kg of sodium carbonate. The second crystallizer feed 3' may contain not more than 30 g/kg, preferably not more than 20 g/kg, more preferably not more than 15 g/kg, most preferably not more than 10 g/kg of sodium bicarbonate. The second crystallizer feed 3' comprises water-soluble impurities such as sodium chloride (NaCl), sodium sulfate ($Na_2SO_4$), silicates, and/or organics. The second crystallizer feed 3' may contain at least 0.1 g/kg, preferably 0.5 g/kg of Si (counted as silica). The second crystallizer feed 3' may contain not more than 1.5, preferably not more than 1 g/kg of silica. It is also recommended that the second crystallizer feed 3' does not contain more than 60 g/kg, preferably not more than 50 g/kg of sodium chloride, and/or does not contain more than 20 g/kg, more preferably 15 g/kg of sodium sulfate.

If the content in water-soluble impurities (silicates and/or organics) in the second crystallizer feed 3' exceeds what may be acceptable, then the second crystallizer feed 3' may be subjected to a similar magnesium treatment and then separated before being directed to reactor 31.

The reactor 31 serves as a reaction zone for the conversion of sodium carbonate with carbon dioxide ($CO_2$) as well as a crystallizer for making crystalline sodium bicarbonate. The reactor 31 comprises generally a gas-liquid contactor, such as a well stirred gas-liquid reactor, comprising a gas injector able to distribute the gas homogeneously into the reactor. The liquid constitutes advantageously the continuous phase inside the reactor 31, the gas being injected at the bottom and moving upwards. The reactor 31 preferably comprises cooling means, to counteract the exothermicity of the reaction. The temperature inside the reactor 31 may be between 60 and 80° C., more preferably between 65 and 75° C. The temperature of the second crystallizer feed (purge stream 3 and/or part 21' of the mother liquor 29) when it is fed to the reactor 31 is typically at a higher temperature, preferably between 80 and 95° C. In order to obtain a suitable aqueous suspension comprising sodium bicarbonate crystals, the residence time in the reactor 31 may be greater than 10 minutes, preferably greater than 20 minutes.

The carbon dioxide fed to the reactor 31 must react efficiently with the sodium carbonate from the second crystallizer feed in the reactor 31. To that end, it is recommended that the combined source of carbon dioxide such as feedstock 32 and/or $CO_2$-containing effluents 39 and 40 comprises at least 20% in weight, or at least 40%, or at least 60%, or preferably at least 80% $CO_2$. It is particularly efficient to use pure (100%) $CO_2$, but not required.

The $CO_2$ feed to the reactor 31 can have different origins. In some embodiments, the $CO_2$ feedstock 32 may come from a natural gas plant, after having been concentrated for example through an amine process. The $CO_2$ feed preferably comes from the monohydrate soda ash plant, for instance may include the $CO_2$-containing effluent 40 from the calciner 8 used to calcine the trona and/or the $CO_2$-containing effluent 39 from an optional $CO_2$ extraction unit 38. In the process for the joint production of sodium carbonate and sodium bicarbonate crystals as illustrated in FIG. 3, the carbon dioxide feed to reactor 31 may be produced by indirect calcination of a composition releasing $CO_2$ upon calcination, preferably a composition comprising an alkali bicarbonate, more preferably a composition comprising sodium sesquicarbonate or trona. Calcination of trona is advantageously operated between 140 and 180° C. By indirect calcination is meant calcination wherein the composition to be calcined is not in direct contact with the heat source utilized to warm the calciner. This is indeed the situation in conventional calciners, wherein the composition is in direct contact with the combustion gases produced by the burning fuel. In such embodiment, steam heated calciners can be used, wherein the steam is circulated into pipes, and the composition, preferably trona, is heated by contact with the exterior surface of the pipes. The steam is advantageously produced by electricity and steam cogeneration. When calciner 8 in FIG. 3 is a steam heated calciner, it produces the calciner effluent 40 which comprises $CO_2$, after suitable drying for instance by a condensing step, so that the calciner effluent 40 has an elevated concentration in $CO_2$, typically more than 80% in volume, preferably more than 90%, most preferably more than 95%. Thus the calciner effluent 40 comprising $CO_2$ produced that way is especially suitable as part of the carbon dioxide feed to reactor 31 for the production of sodium bicarbonate from sodium carbonate.

The suspension 33 produced into the reactor 31 is subjected to a separation. The separation of the crystals from the suspension can be carried out by any appropriate mechanical separating means, for example by settling, by centrifugation, by filtration or by a combination of these three separating means. The sodium bicarbonate crystals are preferably separated in a separation system 35 (preferably including a filter), dried and packed to form a sodium bicarbonate product 34.

A second liquor stream 36 exits the separation system 35. This second liquor stream 36 may be sent directly at least in part to the tailings pond 4. Alternatively or additionally, the second liquor may be directed (at least in part) to an optional $CO_2$ extraction unit 38. This second liquor stream 36 or part thereof is reacted with vapor 37 (or 'debicarbonated') in the unit 38 to release $CO_2$ from bicarbonate, and upon exiting the unit 38, the debicarbonated liquor stream 36' is sent to the tailings pond 4.

The effluent stream 39 comprising carbon dioxide exits the optional $CO_2$ extraction unit 38 and may be recycled to the reactor 31, as this $CO_2$-containing effluent 39 can serve as a portion of the $CO_2$ feed for the reaction with sodium carbonate.

The tailings pond 4 thus may receive the second liquor stream 36 (or a part thereof) exiting the separation system 35, the debicarbonated liquor stream 36' exiting the unit 38, and/or at least a portion 3" of the purge liquor 3 exiting the monohydrate crystallizer 1. In the tailings pond 4, evaporative and/or cooling crystallization takes place resulting in forming crystals of at least one sodium compound selected from the group consisting of sodium bicarbonate, sodium sesquicarbonate, sodium decahydrate, sodium heptahydrate, sodium monohydrate, and combinations thereof, these crystals accumulating in a solid deposit 5'. The solid deposit 5' preferably contains crystals of at least one sodium compound selected from the group consisting of sodium bicarbonate, sodium sesquicarbonate, sodium decahydrate, and combinations thereof, or more preferably contains crystals of at least one sodium compound selected from the group consisting of sodium bicarbonate, sodium sesquicarbonate, and combinations thereof. The solid deposit 5' is generally contaminated with water-soluble impurities, including silicates and/or organics, some of which may be organic foam-causing agents. At least a portion of this solid deposit 5' (also known as reclaimed solid) is recovered for recycling in the plant.

The recycling of the reclaimed solid to the plant proceeds as follows. The reclaimed solid is first sent to a dissolver 17'. A portion 22 of weak liquor from the weak liquor tank 16 may provide the aqueous medium for the dissolution of the reclaimed solid in the dissolver 17'. Since the dissolution of reclaimed solid in water may be endothermic, the heat necessary for dissolution may be provided by the portion 22 of weak liquor entering dissolver 17' since it is at a higher temperature than the dissolver temperature. The temperature in the dissolver 17' is generally greater than about 90° F. (32° C.), or greater than about 100° F. (38° C.), and at most about 140° F. (60° C.) or at most about 120° F. (49° C.). The operating pressure in the dissolver 17' is generally atmospheric. The residence time in the dissolver 17' is generally at least 10 minutes, and can be up to 60 minutes. The weak liquor tank 16 as illustrated in FIG. 3 or a secondary thickener (not illustrated) used in the separation unit 50 (such as thickener 13' described in FIG. 2) serves as a holding tank for the weak liquor stream 15" to be sent back to the leach tank 10 as previously described for the weak liquor stream 15 of FIG. 1 or the weak liquor stream 15' of FIG. 2.

A portion or all of the stream 23 (comprising dissolved reclaimed solid) exiting the dissolver 17' may be sent to the weak liquor stream 15" exiting the weak liquor tank 16 (as shown) or may be directed to the weak liquor tank 16 (not shown). The weak liquor stream 15" is sent to the leach tank 10 and serves to dissolve the crushed calcined trona to form the saturated or near-saturated solution or liquor 11" which is then fed to the separation unit 50.

If the magnesium compound is added (point 25) to the weak liquor stream 15" (which is an unsaturated sodium carbonate-containing solution), it is recommended, albeit not required, that the stream 23 comprising the dissolved reclaimed solid which exits the dissolver 17' is added to the weak liquor stream 15" at an addition point upstream of the magnesium addition point 25 (as illustrated in FIG. 3).

Alternatively or additionally, the magnesium compound may be added to a saturated or near-saturated sodium carbonate-containing solution such as liquor 11" or any solution going through the separation unit 50, such as at the addition point 18 in the classifier overflow and/or at the addition point 26 in the first thickener 13 described previously in relation to FIG. 1 and FIG. 2.

In an alternative or additional embodiment not illustrated in FIG. 3, a portion or all of the dissolved reclaimed solid (stream 23) exiting the dissolver 17' may be sent to a secondary thickener (not illustrated) used in the separation unit 50 (such as second thickener 13' in the series of thickeners as illustrated in FIG. 2).

Any of the embodiments describing the magnesium treatment according to the process illustrated in FIG. 1 or FIG. 2 is equally applicable to the magnesium treatment according to the process illustrated in FIG. 3.

Referring to any of FIG. 1-3, for any or all of the embodiments of magnesium treatments disclosed herein, suitable (albeit not limiting) magnesium compounds include magnesium oxide, magnesium hydroxide, magnesium nitrate, magnesium sulfate, magnesium sulfite, magnesium sulfide, magnesium carbonate, magnesium chlorate, magnesium perchlorate, magnesium chloride, any anhydrous or hydrous form thereof, or any combinations of two or more thereof. Preferred magnesium compounds to be used as at least one magnesium compound in the magnesium treatment are magnesium chloride, magnesium sulfate, and/or magnesium carbonate, more preferred magnesium chloride.

Referring to any of FIG. 1-3, although the addition of the magnesium compound may be carried out at the same time as any flocculent addition in any of the thickening stages (such as in the first thickener 13 and/or the second thickener 13'), it is preferred to add the magnesium compound at least 5 minutes, or preferably at least 20 minutes, or more preferably at least 30 minutes, before the flocculent is added inside the thickener 13 or 13' or added to the classifier overflow 18 which feeds the thickener 13. The precipitation of magnesium silicate usually forms very small solid particles, which are not effectively separated out in the classifier 12; thus the bulk of the insoluble (including precipitated) particles is removed in the thickener 13, whereas the remainder of the insoluble (precipitated) particles which are not removed in the thickener 13 will be removed from the saturated or near-saturated solution exiting the thickener 13 (thickener overflow) in the filtration unit 14 to provide the filtrate 27 (clear or purified solution) which is ultimately fed, in part or entirely, to the crystallizer 2.

Additionally or alternatively, according to another embodiment carried out in any of FIG. 1-3, a supplemental magnesium treatment may be carried out on a saturated or near-saturated sodium carbonate-containing solution which is downstream of the filtration unit 14 but before its entry into the crystallizer 2. Such treatment is not preferred if there is no additional separation unit positioned downstream of the supplemental magnesium treatment in order to remove insolubles before the treated solution is fed to the crystallizer 2. Indeed, without additional separation, the magnesium precipitate will remain in the liquor which enters the crystallizer 2 thus contaminating the final product 9 and further increasing scaling risk of the crystallizer heat exchanger 7. As an example of such supplemental magnesium treatment, an amount of reagent comprising or consisting essentially of a magnesium compound is added (e.g., point 20) to a centrate liquor to remove some soluble silicates by silicate precipitation and/or to remove some organic impurities, some of which may be foam-causing agents. The magnesium compound treatment may be carried out at any location between the exit point of the centrate liquor 29 from the centrifugal separator 28 and the liquor exit of the centrate tank 19, but the addition is preferably carried out in the centrate tank 19 (e.g. addition point 20). The temperature in the centrate tank 19 is generally between 140° F. and 210° F. (60-99° C.). The operating pressure in the centrate tank 19 is generally atmospheric. The residence time of the liquor in the centrate tank 19 is generally at least 10 minutes, and can be between 20 and 60 minutes. Care must be taken to not add so much magnesium that customer specifications for magnesium content in the final product 9 (soda ash) are exceeded. The magnesium compound is added at a level to achieve the desired removal of soluble silicates present in the liquor passing through the centrate tank 19. The resulting treated centrate liquor stream 21 (which is leaner in soluble silicates) exiting the centrate tank 19 is then reintroduced into the crystallizer 2. While in preferred embodiments, the magnesium silicate precipitate is not separated from the treated centrate liquor stream 21, the particle size of the final product 9 (soda ash) can be improved if the weight % silicate to magnesium ratio in the final product is maintained to 1 or less. In alternate embodiments, the treated centrate liquor may be sent to a separation unit (not illustrated) different than the tank 19 to remove insolubles and to provide the liquor stream 21 which is then fed to the crystallizer 2.

To determine the amount of magnesium compound which needs to be added for silicates removal at one or more locations within the soda ash plant as described above for FIG. 1-3, the amount of silicon (e.g., ppm silicates reported as Si) may be monitored on a regular basis. For example, liquor aliquots from the weak liquor stream 15 or 15' or 15", from the classifier overflow 18, from the overflow of thickener 13, from the filtrate 27 exiting filtration unit 14, from the centrate liquor 29, or even from the crystallizer feed 1 may be analyzed for silicon content using, for example, an Inductively Coupled Argon Plasma technique (ICP being an analytical technique used for elemental determinations) or applicable colorimetric procedures. Rising silicon contents in successive liquor aliquots may be used as an indication that the dosage of magnesium compound should be increased.

Although nearly 100% removal of soluble silicates can be achieved by this treatment method, it is not necessary to remove all of the soluble silicates impurities to provide an improved soda ash product quality and/or to reduce equipment maintenance costs by minimizing scale formation. The present magnesium treatment for removing soluble silicates is believed to be effective in reducing the friability of the crystalline final product 9 to provide suitable particle size distribution and/or in increasing the effective life of the crystallizer heat exchanger 7. Reducing friability of the soda ash final product 9 is not only good for the product particle size and customer, but it also increases production capacity as some of these broken crystals (fines) get recycled back to the crystallizer in the form of solution or crystals; if the fines are separated from the product and recycled as dissolved in water or in weak liquor, the sodium carbonate needs to be recrystallized and dried, both steps causing a reduction of capacity; or if the fines are recycled as crystals, they will rehydrate and need to be dried causing a reduction of capacity. As an example, the treatment with magnesium may be effective in achieving a silicon content of 100 ppm Si or less, or 75 ppm Si or less, or even 50 ppm Si or less, in filtrate 27 or in crystallizer feed 1. For example, in an operation of a soda ash process as illustrated in FIG. 2, a filtrate 27 with a silicate content of less than 90 ppm as Si has proven successful in achieving adequate specification in the soda ash final product 9 when reclaimed 'deca' from a tailings pond 4 was recycled to the soda ash plant and $MgCl_2$ was added to either a saturated or near-saturated solution (e.g., classifier overflow 18), or to an unsaturated solution (e.g., weak liquor 15' or 'deca' dissolver 17).

In any of or all of the embodiments according to the present invention, the reagent used in the magnesium treatment according to the present invention (e.g., to remove soluble silicates, to reduce scaling in crystallizer system, and/or to reduce foaming in the crystallizer) may comprise or consist essentially of at least one magnesium compound. The reagent generally includes or is an aqueous solution or dispersion of at least one magnesium compound. The reagent preferably comprises or consists essentially of an aqueous solution of a magnesium compound, e.g., the magnesium compound is completely dissolved in water. The reagent may comprise two or more magnesium compounds which may differ in water solubility. The magnesium compound is preferably an inorganic salt in which the counter-anion is compatible with the process conditions and is not prone in creating issues for downstream units and operations such as separation and/or monohydrate crystallization. Suitable, but not limiting, magnesium inorganic salts include magnesium oxide, hydroxide, nitrate, sulfate, sulfite, sulfide, carbonate, chlorate, perchlorate, chloride, or any combinations of two or more thereof. A preferred magnesium inorganic salt to be used as at least one magnesium compound in the treatment is magnesium chloride.

The magnesium compound may be soluble or insoluble in water at ambient temperature. Applicants have observed that the removal of silicates is more effective with a water-soluble inorganic magnesium salt (e.g., $MgCl_2$, $MgSO_4$) compared to that obtained with a water-insoluble inorganic magnesium salt (e.g., $MgCO_3$). Examples of suitable, but not limiting, magnesium inorganic water-soluble salts include magnesium nitrate, sulfate, sulfite, chlorate, perchlorate, chloride, or any combinations of two or more thereof, with magnesium sulfate and/or magnesium chloride being preferred as magnesium inorganic water-soluble salt. When the reagent for magnesium treatment comprises more than one magnesium compound in water, at least one of the magnesium compounds in the reagent should be water-soluble, so that the reagent may comprise at least one magnesium compound dissolved in water and one or more other magnesium compounds which may be dissolved or may remain insoluble (thus forming a solid suspension in water) in the reagent. Although not wishing to be bound by the following theoretical explanation, Applicants believe that the greater effectiveness of a reagent comprising or consisting of a water-soluble magnesium salt (which is dissolved in water for the treatment) is linked to the formation of very small insoluble particles creating a large surface contact area when added to the sodium carbonate-containing solution compared to a reagent comprising or consisting of particulate magnesium salt in suspension. These very small precipitated insoluble particles most likely contain initially water-insoluble magnesium carbonate which then gets converted to even more water-insoluble magnesium silicate. For this reason, when the sodium carbonate-containing solution is treated with a magnesium reagent at locations that are closer to the crystallizer 2, such as in the centrate loop including centrate tank 19, it is believed that, due to a shorter contact time, the treatment with a water-soluble magnesium salt may be preferred. On the other end, when the treatment is carried out on the weak liquor (e.g., in weak liquor tank 16 of FIG. 1-3 or at addition point 25 in weak liquor stream 15, 15' or 15" of FIG. 1 to FIG. 3 respectively, or in dissolver 17, 17' of FIG. 2 and FIG. 3, or in secondary thickener 13' in FIG. 1-2), because there is a longer contact time between magnesium and the silicate impurities, the treatment of the weak liquor may be carried out with a water-soluble magnesium salt dissolved in water and/or a water-insoluble magnesium salt of sufficiently small particle size (e.g., less than 50 microns) dispersed or suspended or slurried in water.

In practice however, a solution of water-soluble magnesium salt would still be preferred for the treatment at any of the above-mentioned locations in the soda ash plant, because the handling of such solution through pump and conduits is easier than a suspension or dispersion or slurry comprising a particulate magnesium salt. Indeed, insoluble magnesium salt slurries can be very thick and/or viscous. As an example, a 13.7% magnesium hydroxide slurry is a very thick clay-like consistency; and a 15% magnesium carbonate slurry has a paste-like consistency.

For reducing foaming events in the crystallizer 2, the magnesium treatment may be carried out on an aqueous unsaturated sodium carbonate-containing solution (with less than 20% sodium carbonate, or preferably between 3 and 15% sodium carbonate), such as the weak liquor in tank 16 (in FIGS. 1 to 3), in dissolver 17 or 17' (in FIGS. 2 and 3), or in weak liquor stream 15, 15', or 15" (in FIGS. 1 to 3). An optional supplemental magnesium treatment may be performed as needed on a saturated or near-saturated solution which comprises dissolved calcined trona (e.g., in the leach tank 10, in the classifier overflow 18), on solution or liquor 11, 11', or 11" exiting the leach tank 10, on any solution passing through the separation units (such as unit 12 or 13), or, although not preferred, on the centrate liquor (e.g., in the centrate tank 19) to form precipitates and/or complexes with foam-causing agents which are present in the solution and/or reduce their foaming propensity.

Alternatively, the magnesium treatment may be carried out for reducing foaming events in the crystallizer 2 solely on an aqueous saturated or near-saturated solution (with 20% sodium carbonate or more, preferably with from 20 to 33% sodium carbonate), such as at any point between the leach tank 10 and the filtration unit 14, particularly in the classifier overflow 18.

In any of or all of the embodiments according to the present invention, it is preferred to carry out the magnesium treatment at a temperature between 20° C. and 90° C. (68° F. to 194° F.), more preferably between 40° C. to 85° C. (104° F. to 185° F.), and for at least 5 minutes. The magnesium treatment may be carried out at a pH of between 10.5 and 12, preferably of between 11.1 and 11.9, preferably of between 11.4 and 11.8.

In most instances, it is not recommended to add the magnesium compound directly to the crystallizer 2, because there may not be sufficient time for effective formation of insoluble magnesium silicate inside the crystallizer 2 and/or there will not be a means of separating the silicon-containing insolubles formed in the crystallizer. In preferred embodiments, the magnesium treatment for the removal of soluble silicates according to the present invention excludes directly adding a magnesium compound to the crystallizer. However it is to be understood that, when the magnesium treatment according to the present invention is performed in a solution upstream of the crystallizer, it may further include carrying over unreacted soluble magnesium compound to the crystallizer, in instances when there is an excess of added magnesium with respect to the amount of impurities (e.g., silicates) to be removed, and/or when the impurities removal is incomplete because of insufficient reaction time. Thus it is possible that a remainder of the magnesium compound which has been added at one or more locations upstream of the crystallizer 2 and which has not been converted to magnesium silicate and magnesium carbonate may enter the crystallizer 2.

In some embodiments, the magnesium treatment may further include adding a magnesium compound to the trona calciner 8 for the purpose of removing impurities from the trona ore. In yet other embodiments, the magnesium treatment excludes adding a magnesium compound to the trona calciner 8.

The magnesium treatment may be carried out at a single addition point upstream of the sodium carbonate monohydrate crystallizer in the soda ash plant, or may be carried out at two or more points upstream of such monohydrate crystallizer.

The magnesium treatment may be effective in improving at least one soda ash process parameters: 1) reducing the fines content in the soda ash final product; 2) reducing the incidence of scale formation in the crystallizer heat exchanger; and/or 3) reducing or eliminating the incidence of foaming events in the crystallizer.

In any of or all of the embodiments according to the present invention, it is envisioned that, to prevent the accumulation of certain magnesium counter ions in the process to produce sodium carbonate, sulfite and/or bicarbonate, there may be a need to use two or more different magnesium compounds for removing soluble silicates, for reducing the fines content in the soda ash final product, for reducing the incidence of scale formation in the crystallizer heat exchanger, for removing soluble organic compounds (including those that are foam-causing agents) and/or for reducing foaming events in the crystallizer. For instance, a first magnesium compound may be added to a weak liquor, while a second (different) magnesium compound may be added to one or more saturated or near-saturated solutions (e.g., solution or liquor 11, 11', 11" comprising dissolved calcined trona; solutions going through the separation system including units 12, 13, 14; or centrate liquor). As a non-limiting example, a water-insoluble or less water-soluble magnesium compound (such as magnesium oxide, hydroxide, and/or carbonate) may be used in the weak liquor 15, 15', 15" or in tank 16, while a highly water-soluble magnesium compound (such as magnesium chloride and/or sulfate) may be used in the leach tank 10, in classifier overflow 18, in thickener 13, and/or less preferably, in the centrate tank 19.

It is also envisioned that there may be a need to use several addition points for the same magnesium compound for removing soluble silicates, and/or reducing scaling in the crystallizer heat exchanger, and/or removing soluble organic compounds (including foam-causing agents) and/or reducing foaming events in the crystallizer. For instance, a first portion of the magnesium compound may be added to an unsaturated solution, while a second portion of the same magnesium compound may be added to one or more saturated or near-saturated solutions.

According to yet another not-illustrated embodiment of the present invention, the method may further comprise the addition of hydroxide so as to favor the conversion of sodium bicarbonate to sodium carbonate. This step may be carried out regardless of where the magnesium treatment takes place, that is to say whether it be carried out on the weak liquor 15, 15', 15" or in weak liquor tank 16, or additionally on the saturated or near-saturated solution (e.g., in the leach tank 10, in solution or liquor 11, 11', 11", in the centrate liquor, in the centrate tank 19). Applicants have found that the presence of sodium bicarbonate in the crystallizer feed 1 (saturated or near-saturated solution) negatively impacted the crystallization of sodium carbonate monohydrate in the crystallizer 2, especially if the sodium bicarbonate is allowed to exceed its saturation point varying from 1.5% to 3.5% in the crystallizer 2 (the range being depending on the crystallizer temperature).

The bicarbonate content in the saturated or near-saturated solution resulting from dissolved calcined trona is typically dictated by appropriate selection of the calcination conditions. Thus, in general, the bicarbonate content is deliberately maintained at sub-saturation level. However, when a reclaimed solid (such as comprising sodium carbonate decahydrate, bicarbonate, and/or sesquicarbonate) is recycled to the soda ash production, it brings along significant amounts of sodium bicarbonate, and the usual control on the bicarbonate content of the feed to the monohydrate crystallizer is not effective in this scenario.

The hydroxide addition or pH adjustment for bicarbonate removal is preferably carried out after the magnesium treatment, but can also be carried out before or during the magnesium treatment. The pH adjustment is generally performed by adding at least one alkaline compound, preferably in soluble form, such as a solution of sodium hydroxide, to achieve a final solution pH of about 11.5. Adjusting the pH can be performed in the weak liquor tank 16, leach tank 10, thickener 13, or centrate tank 19. Adjusting the pH is preferably performed in the leach tank 10. As explained earlier, for practicality, the leach tank 10 may comprise two or more vessels operated in series in which several stages of dissolution take place. In such case, the pH adjustment can be performed on the most downstream vessel so that there is sufficient time in the formation of water-insoluble matter (such as magnesium silicates) before pH is adjusted to convert the sodium bicarbonate to sodium carbonate.

Although not illustrated in FIG. 1-3, the weak liquor tank 16, or the dissolver 17, 17', or the centrate tank 19 may be provided with a means for agitation, such as an impeller, a stirrer, a mixer, a high-flow recirculation loop, and the like. The agitation would rapidly disperse the magnesium compound inside the weak liquor tank content to maximize the contact area between the magnesium cations and impurities (e.g., silicate anions, foaming agents). If the magnesium compound is added in a conduit (for example the conduit through which the weak liquor stream 15, 15', or 15" flows), the addition of the magnesium compound should be done in such a manner to provide good mixing for the magnesium compound to disperse well in the solution flowing through the conduit.

FIG. 4 illustrates a block process flow diagram of a plant for producing crystalline sodium sulfite from a sodium alkali solution.

Sodium sulfite may be produced by the reaction of sulfur dioxide gas 105 with a sodium alkali solution in a reactor 104. The sodium alkali solution may be a sodium hydroxide solution or a sodium carbonate-containing solution as identified as 101. Sodium carbonate-containing solutions can be prepared from calcining and dissolving sodium sesquicarbonate (trona ore), and silicates in the trona ore become water soluble during the calcination process, as explained in the context of FIG. 1-3. For example, the saturated or near-saturated sodium carbonate-containing solution shown as purified solution or filtrate 27 in FIG. 1-3 would be a suitable feedstock for the sodium carbonate-containing solution 101 used in the process carried out in FIG. 4.

Soluble silicates can be reduced by the addition of magnesium (e.g., addition point 102), specifically a water-soluble compound, such as magnesium chloride or magnesium sulfate, prior to a clarification process comprising a thickener 103. The resultant silicate reduced sodium carbonate-containing solution is then fed into the reactor 104 where sulfur dioxide gas 105 is added. The resultant sodium sulfite liquor may be also treated with magnesium addition (e.g., addition point 106) while being transferred to the crystallizer feed tank 107. The precipitated sodium silicate present in the resultant liquor is removed by a filter 108 prior to addition of the liquor into the crystallizer 109. As evaporation of water takes place in the crystallizer, water soluble impurities concentrate. Eventually it becomes necessary to reduce or maintain these impurities at a level consistent with the product quality requirement. To achieve this, a purge stream 110 is removed from the process. Magnesium, specifically a water-soluble magnesium compound, such as magnesium chloride or magnesium sulfate, can also be added to this stream 110 to precipitate magnesium silicate which can be filtered in a filter 111 to remove the insoluble matter. Removal of silicate from the process liquors prior to increasing the liquor temperature in a heat exchanger 112 prevents the deposition of insoluble silicates on the tubes which results in increased on stream time and decreases the need for expensive cleaning. As a result of the addition of magnesium and the precipitation and removal of insoluble silicate, the sodium sulfite product 113, which is dried after being withdrawn from the crystallizer 109, has lower content in water insoluble matter thus meeting the requirements of photo-chemical grade sodium sulfite. While addition of water-soluble magnesium salt is preferred, it is also envisioned to add water-insoluble magnesium salt, such as magnesium oxide or hydroxide. Any magnesium compound being previously listed in reference to FIG. 1-3 is also applicable here.

In addition to higher sodium sulfite product quality, the overall reduced silicate content by adding the magnesium compound as early in the process as possible further results in increased on-stream time and lower cost of production by reducing the frequency of need to clean the heat exchanger.

The carrying out of the magnesium treatment according to the present invention provides one or more of the following advantages: improving product quality by decreasing the friability of crystalline sodium carbonate product or improving the photo-chemical property of crystalline sodium sulfite product; reducing the propensity of scale formation on equipment (particularly the crystallizer heat exchanger) exposed to silicates-containing solution by the reduction of soluble silicate content in such solution, thus decreasing the frequency of expensive high pressure washes of the crystallizer heat exchanger; and allowing the recycling of sodium carbonate decahydrate values (which are precipitated from the crystallizer purge liquor and deposited in a tailings pond) to the production of sodium carbonate, thus reducing the volume taken up by this deposit and increasing the longevity of the tailings pond and mine reserves and lowering the cost of production.

The carrying out of the magnesium treatment in the soda ash plant according to the present invention provides an additional or alternate advantage when there is recycling of sodium carbonate decahydrate recovered from a tailings pond, by reducing or eliminating the incidence of foaming in the sodium carbonate monohydrate crystallizer due to the presence of foam-causing agents which are carried over into the process by the reclaimed solid (such as the recycled 'deca') and/or introduced from the calcined ore. The magnesium treatment may cause a reduction in content of these foam-causing agents and/or may cause a modification in their chemical structure which reduces their propensity to cause foaming in the crystallizer and/or in peripheral units associated with the crystallizer.

The present invention having been generally described, the following Examples are given as particular embodiments of the invention and to demonstrate the practice and advantages thereof. It is understood that the examples are given by way of illustration and are not intended to limit the specification or the claims to follow in any manner.

EXAMPLES

Example 1

A sample of sodium carbonate decahydrate ('deca') was added to the soda ash process weak liquor to increase the total alkalinity as sodium carbonate (TA) of the sample to ~13%. The sample was analyzed for silicon by Inductively Coupled Argon Plasma (ICP) shortly after adding the deca (result ~300 ppm; this was a semiquantitave test that turned out to be half of the actual concentration). Different magnesium compounds were added to aliquots of this solution to remove soluble silicate. Aliquots of magnesium salts were added with the goal of removing half of the silicate and all of the silicate. The mixtures were stirred for 5 minutes and then filtered through a 5-micron filter. Magnesium oxide was added as a 13.5% slurry, magnesium chloride as a 15% solution and magnesium carbonate as a 15% slurry. A portion of the starting solution was filtered with no Mg added. The final filtrates were analyzed for TA, water insoluble matter (insol) and metals by ICP. The results are presented in TABLE 1.

TABLE 1

Silicate removal from a deca/weak liquor mixture with various magnesium compounds

| Sample: | Weak Liquor (WL) | deca/WL Starting Solution Unfiltered | deca/WL Starting Solution Filtered | MgO added to remove ~150 ppm Si | MgO added to remove ~300 ppm Si | MgCl$_2$ added to remove ~150 ppm Si | MgCl$_2$ added to remove ~300 ppm Si | MgCO$_3$ added to remove ~150 ppm Si | MgCO$_3$ added to remove ~300 ppm Si |
|---|---|---|---|---|---|---|---|---|---|
| % TA as Na$_2$CO$_3$ | 6.01 | 13.31 | 13.52 | 13.19 | 12.87 | 13.08 | 12.93 | 13.30 | 13.25 |
| ppm Insol | NA | NA | 1213 | 1231 | 2441 | 1400 | 3742 | 1300 | 1899 |
| ppm Mg | | | 2.9 | 57 | 65 | 80 | 51 | 23 | 31 |
| ppm Si | | | 563 | 485 | 447 | 431 | 229 | 542 | 539 |
| % Mg Increase | | | | 1866 | 2141 | 2659 | 1659 | 693 | 969 |
| ppm Si Reduction | | | | 78 | 116 | 132 | 334 | 21 | 24 |
| % Si Reduction | | | | 13.9 | 20.6 | 23.5 | 59.3 | 3.7 | 4.3 |

When the magnesium compounds were added to the deca/WL solution, small white particles formed instantly. When the solutions were placed on a stir plate to agitate, a white "snowflake" like precipitate formed. The "snowflake" precipitate increased for about one minute after which the particle size began to decrease. The solution became cloudy in appearance. The magnesium chloride addition at a 100% silicate removal target was the most cloudy and most difficult to filter. For this particular experiment, magnesium chloride removed silicate most effectively in the unsaturated deca/weak liquor solution while magnesium carbonate removed the least amount of silicate. It is expected that increased contact time and/or better agitation may improve the magnesium carbonate results.

Example 2

A sample of deca was added to weak liquor (WL) to increase the TA of the sample to ~13%. The sample was filtered and analyzed for silicon (~500 ppm Si). Aliquots of a 30% magnesium chloride solution were added to a 200-g sample of the WL/deca solution to remove silicate. The solutions were mixed for 5 minutes, allowed to rest for a couple of minutes, then filtered and the final filtrates were analyzed for TA, insolubles content and metals by ICP. The $MgCl_2$ was added in an amount to remove the molecular equivalent of 50%, 75%, 100%, and 125% of the moles of Si present, assuming that one mole of Mg reacts with one mole of Si.

TABLE 2

Silicate removal from a deca/weak liquor mixture with various amounts of magnesium chloride at ambient conditions

| Sample: | Filtered Starting Solution | $MgCl_2$ added 50% mole equiv | $MgCl_2$ added 75% mole equiv | $MgCl_2$ added 100% mole equiv | $MgCl_2$ added 125% mole equiv |
|---|---|---|---|---|---|
| g of 30% $MgCl_2$ added to 200 g of WL/deca solution | NA | 0.64 | 0.95 | 1.23 | 1.57 |
| ppm Mg added | NA | 245 | 363 | 470 | 600 |
| % $Na_2CO_3$ | 13.02 | 13.06 | 12.95 | 12.84 | 12.64 |
| % $NaHCO_3$ | 0.33 | 0.56 | 0.63 | 0.65 | 0.67 |
| ppm Insol | 2130 | 3688 | 4903 | 2283 | 2651 |
| ppm Mg | 3.9 | 145 | 219 | 262 | 344 |
| ppm Si | 479 | 267 | 263 | 253 | 167 |
| ppm Si Reduction | NA | 212 | 216 | 226 | 312 |
| % Si Reduction | NA | 44 | 45 | 47 | 65 |

The results presented in TABLE 2 further demonstrate that the magnesium chloride removed silicate from the unsaturated sodium carbonate-containing solution. The treated solutions increased in cloudiness as the % in magnesium chloride addition increased.

Example 3

A sample of decahydrate was added to a weak liquor to form a deca/WL solution with a TA of ~13%. Varying amounts of a 30% magnesium chloride solution were added to a 200-g sample of the deca/WL solution to remove soluble silicate. The resulting treated solutions were mixed for 5 minutes allowed to rest for a couple of minutes, then filtered (b & c). A control sample with no magnesium chloride added was also filtered (a). The pH of a portion of the deca/WL solution was raised to 11.7 using 10% NaOH solution. A portion of the resulting higher pH solution was filtered without any $MgCl_2$ addition (d). Two 200-g portions of this higher pH solution were treated with the 30% $MgCl_2$ solution, then filtered (e & f). Two portions of the unfiltered starting solution without pH adjustment were also treated with $MgCl_2$ and after stirring for 5 minutes, the pH was raised to 11.7 with the 10% NaOH solution, and the samples were then filtered (g & h). All of filtrates were analyzed for TA, pH, NaCl, insolubles (insol.) and metals by ICP. The solution (d) which had its pH raised and then filtered was used as the starting Si value for the four samples which had caustic solution added to them. The results are presented in TABLE 3. By adjusting the pH alone and reducing or eliminating the sodium bicarbonate content, the silicate levels increased (207 ppm Si to 361 ppm Si). This indicated that the most silicate removal occurred when magnesium chloride was first added at a silicate removal target of 100% and then the pH was adjusted to convert the sodium bicarbonate.

Example 4

A sample of sodium carbonate decahydrate ('deca') was dissolved in water to make a $Na_2CO_3$ solution of ~13% TA. This solution was heated to about 150° F. and filtered (through both a large paper filter and a small 5-micron filter). The filtrate was analyzed for Si. Two samples were treated with >100% mole equivalents of $MgCl_2$ and $MgCO_3$ to precipitate silicate present in the decahydrate. The mixtures were then filtered and analyzed for TA, Insolubles and metals by ICP. A sample of a liquor purged from a soda ash crystallizer was diluted by 25% to prevent crystallization of the carbonate as it cooled, heated to about 150° F. and the same procedure as above was followed. It was noted that the treated purge solutions filtered much slower than the decahydrate solutions, and the insolubles seemed to be "slimier" than the insolubles from the treated decahydrate solutions. Solutions were maintained around 150° F. throughout the test and were agitated as the Mg compounds were added and during precipitation. All samples treated with magnesium were stirred at 150° F. for 30 minutes before filtering.

The results are presented in TABLE 4. The test demonstrated that silicate removal at 150° F. was successful with both magnesium carbonate and magnesium chloride. The 30-minute agitation time appeared to improve the silicate removal. The magnesium chloride removed silicate more readily than the magnesium carbonate. However there was more silicate removal using the magnesium carbonate in the saturated or near-saturated purge liquor compared to the unsaturated deca liquor.

TABLE 3

Silicate removal and sodium bicarbonate removal from a deca/weak liquor mixture with magnesium chloride at ambient conditions

| Sample | (a) Starting deca/WL Solution Filtered | (b) MgCl$_2$ added | (c) MgCl$_2$ added | (d) Starting Soln pH'd to 11.7 then Filtered | (e) Soln pH'd to 11.7, then MgCl$_2$ added, then filtered | (f) Soln pH'd to 11.7, then MgCl$_2$ added, then filtered | (g) MgCl$_2$ added, then Soln pH'd to 11.7, then filtered | (h) MgCl$_2$ added, then Soln pH'd to 11.7, then filtered |
|---|---|---|---|---|---|---|---|---|
| g of 30% MgCl$_2$ added to 200 g of deca/WL solution | NA | 0.64 | 1.25 | NA | 0.63 | 1.26 | 0.64 | 1.23 |
| % Mole Equiv of Mg Added | — | 118 | 231 | — | 67 | 134 | 68 | 130 |
| ppm Mg added | | 245 | 478 | | 241 | 482 | 245 | 470 |
| % Na$_2$CO$_3$ | 11.96 | 11.58 | 11.67 | 11.54 | 11.54 | 11.41 | 11.86 | 11.76 |
| % NaHCO$_3$ | 0.12 | 0.19 | 0.20 | 0.00 | 0.09 | 0.16 | 0.00 | 0.00 |
| % NaOH | 0.00 | 0.00 | 0.00 | 0.01 | 0.00 | 0.00 | 0.02 | 0.01 |
| % NaCl | 0.14 | 0.25 | 0.36 | 0.15 | 0.25 | 0.36 | 0.23 | 0.35 |
| Filt Soln pH | 11.31 | 11.12 | 11.10 | 11.71 | 11.35 | 11.25 | 11.71 | 11.68 |
| ppm Insol | 2689 | 2371 | 2500 | NA | 2597 | 3514 | 3059 | 4733 |
| ppm Mg | 1.5 | 201 | 430 | 2 | 138 | 261 | 59 | 87 |
| ppm Si | 207 | 156 | 110 | 361 | 189 | 164 | 210 | 108 |
| ppm Si Reduction | | 51 | 97 | | 172 | 197 | 151 | 253 |
| % Si Reduction | | 25 | 33 | | 48 | 55 | 42 | 70 |

TABLE 4

Silicate removal from a decahydrate solution or a purge solution with magnesium chloride and magnesium carbonate at 150° F.

| Sample: | Deca Starting Solution | Deca Soln Treated 30% MgCl$_2$ | Deca Soln Treated with 10% MgCO$_3$ | Purge Starting Solution | Purge Soln Treated with 30% MgCl$_2$ | Purge Soln Treated with 10% MgCO$_3$ |
|---|---|---|---|---|---|---|
| g of 30% MgCl$_2$ or 10% MgCO$_3$ added to 200 g of Deca/Purge solution | NA | 1.60 | 4.20 | NA | 2.65 | 7.00 |
| ppm Mg added | — | 612 | 605 | — | 1014 | 1009 |
| % Mole Equiv of Mg Added | — | 114 | 112 | — | 120 | 119 |
| % Na$_2$CO$_3$ | 14.00 | 13.76 | 14.08 | 20.53 | 20.85 | 21.10 |
| % NaHCO$_3$ | 0.13 | 0.56 | 0.41 | 1.48 | 2.13 | 1.87 |
| ppm Insol | | 3675 | 3270 | 29 | 5267 | 6147 |
| ppm Mg | 2.0 | 26 | 41 | 1.1 | 267 | 148 |
| ppm Si | 620 | 56 | 212 | 976 | 61 | 169 |
| ppm Si Reduction | — | 564 | 408 | — | 915 | 807 |
| % Si Reduction | — | 91 | 66 | — | 94 | 83 |

Example 5

A sample of a sodium sulfite purge solution was filtered and analyzed for silicon by ICP. The solution was treated with a 30% magnesium chloride solution to remove silicate. This test was repeated with different weights of the MgCl$_2$ solution, and then additional portions of the sodium sulfite solution were treated with two different weights of a 30% magnesium sulfate solution. Each solution was mixed for 5 minutes then allowed to rest for a couple of minutes before filtering. The resulting filtrates were analyzed for insolubles and metals by ICP. It was noted that the samples which were treated with MgCl$_2$ filtered much slower than the samples that were treated with MgSO$_4$. The results are presented in TABLE 5. The test demonstrated that a precipitate formed with both magnesium sulfate and magnesium chloride addition, and that the silicate content in the solutions was reduced when magnesium chloride and magnesium sulfate were added. The precipitate formed when adding the magnesium chloride was gelatinous. The liquor with the magnesium chloride added was more difficult to filter versus the liquor with the magnesium sulfate.

TABLE 5

Silicate removal from a sodium sulfite purge liquor with addition of magnesium chloride or magnesium sulfate at ambient conditions

| Sample: | Filtered Starting Sulfite Purge Solution | Sulfite Soln Treated with $MgCl_2$ | Sulfite Soln Treated with $MgCl_2$ | Sulfite Soln Treated with $MgSO_4$ | Sulfite Soln Treated with $MgSO_4$ |
|---|---|---|---|---|---|
| g of 30% $MgCl_2$ or $MgSO_4$ added to 200 g of sulfite purge solution | NA | 0.68 | 1.35 | 0.86 | 1.70 |
| ppm Mg added | | 260 | 516 | 261 | 515 |
| % Mole Equiv of Mg Added | | 37 | 73 | 37 | 73 |
| ppm Insol | | 722 | 2307 | 93 | 188 |
| ppm Mg | 2 | 451 | 742 | 378 | 758 |
| ppm Si | 813 | 666 | 489 | 579 | 545 |
| ppm Si Reduction | | 147 | 324 | 234 | 268 |
| % Si Reduction | | 18 | 40 | 29 | 33 |

Example 6

A sample of sodium sulfite purge was filtered and analyzed for silicon by ICP (Inductively coupled argon plasma). The solution was treated with a 30% magnesium chloride solution to remove silicate. The solutions were mixed for 5, 30, and 60 minutes, allowed to rest for a couple of minutes, and then filtered. The resulting filtrates were analyzed for insolubles and metals by ICP. The initial temperature of the sulfite purge sample was 167° F., and it cooled to 149° F. before it was treated with $MgCl_2$. The temperature of the solutions which were stirred for more than 5 minutes were heated back to the initial liquor temperature of 167° F., and the final temperature was measured before filtering the samples. The results are presented in TABLE 6. When magnesium chloride was added to the sulfite liquor, a large "snowflake" like crystal formed. As the solution was agitated, the particles became finer and more gelatinous. When magnesium chloride was added, the silicate content in the liquor was reduced. The silicate reduction increased to about 89% removal after 30 minutes. As the mixture was agitated to 60 minutes, the silicate removal remained about the same.

TABLE 6

Silicate removal from a sodium sulfite purge liquor with addition of magnesium chloride under process conditions

| Sample: | Filtered sodium sulfite purge Starting Solution | Sulfite Soln Treated with $MgCl_2$ - 5 min agitation | Sulfite Soln Treated with $MgCl_2$ - 30 min agitation | Sulfite Soln Treated with $MgCl_2$ - 60 min agitation |
|---|---|---|---|---|
| g of 30% $MgCl_2$ added to 200 g of sulfite purge solution | NA | 1.87 | 1.85 | 1.86 |
| ppm Mg added | — | 715 | 708 | 711 |
| % Mole Equiv. of Mg Added | — | 114 | 113 | 113 |
| Final Soln Temp (° F.) | NA | 145 | 163 | 167 |
| ppm Insol | 350 | 1500 | 2611 | 2698 |
| ppm Mg | 1 | 508 | 242 | 237 |
| ppm Si | 724 | 252 | 79 | 98 |
| ppm Si Reduction | — | 472 | 645 | 626 |
| % Si Reduction | — | 65 | 89 | 86 |

Example 7

A test was carried out in a soda ash plant as illustrated in FIG. 1, where a solution of 27% wt. magnesium chloride ($MgCl_2$) was added to the rake classifier overflow 18 exiting the classifier 12. The classifier overflow 18 was at a temperature of about 180° F. (82.2° C.) and contained dissolved calcined trona and impurities including silicates originating from calcined trona. The magnesium chloride was injected directly into the classifier overflow 18 which flowed into a small surge tank (not illustrated) into the suction of a pump and out to the thickener (first thickener 13) operated at a temperature of about 170° F. (76.7° C.). The retention time from the magnesium chloride addition point to the center well of the thickener 13 was approximately 10 minutes. Based on the thickener volume and production flow rates, the thickener residence time was approximately 24 hours.

The flow rate of the 27% wt. magnesium chloride solution was adjusted during the test based on rates of the plant production and flow rates of the classifier overflow as well as a historical average in silicate concentration in the classifier overflow of about 80 ppm as Si, so as for the added Mg to be in stoichiometric excess with respect to Si for theoretically precipitating 115% of the silicate present in the classifier overflow. For example, for a specific flow rate of 3589 gpm in the classifier overflow containing 80 ppm Si resulting in a specific silicon flow of 0.287 gpm Si, an equivalent Mg flow rate of 0.287/1.15=0.249 gpm Mg resulted in a flow rate of 4.2 gpm of the 27% $MgCl_2$ solution.

Example 8

A sodium carbonate decahydrate solid was recovered from a tailings pond and recycled during a couple of summer months (season No. 1) into the soda ash plant as illustrated in FIG. 2. The amount of 'deca' being recycled to the plant represented about 4% of the total amount of sodium carbonate. The recovered sodium carbonate decahydrate solid was melted and/or dissolved in the dissolver 17, mixed with the thickener supernatant 24 to form the weak liquor stream 15' which was recycled to the leach tank 10 in which calcined trona was dissolved. The classifier overflow 18 thus was an aqueous saturated or near-saturated sodium carbonate-containing solution containing dissolved calcined trona and dissolved reclaimed sodium carbonate decahydrate as well as impurities including soluble silicates and organics carried over from the reclaimed sodium carbonate decahydrate as well as soluble silicates originating from calcined trona. Insolubles were removed in the first thickener 13. The thickener overflow was passed through the filtration unit 14 to generate a saturated or near-saturated sodium carbonate liquor comprising sodium carbonate, at least a part of which was from a dissolved reclaimed decahydrate. The saturated or near-saturated sodium carbonate liquor was fed to the crystallizer 2 to form sodium carbonate monohydrate crystals, which were dried to form the final soda ash product 9.

During this decahydrate recycling season (No. 1), the final soda ash product appeared more friable, and increased fines formation impacted the soda ash quality. In addition during this season, the soda ash plant experienced increased foaming in the crystallizer bodies. Antifoaming agents were added more frequently, and the plant operators noted that the process was harder to control and had more operational upsets.

The pronounced drop in soda ash quality caused by the increase in fines content as well as the increased incidence of foaming in the sodium carbonate monohydrate crystallizer were linked to the recycling of sodium carbonate decahydrate recovered from the tailings pond. Because the recycled 'deca' had a much higher silicates content than the calcined trona, it was hypothesized that soluble silicates carried over from the recycled deca may have increased the soluble silicates content to a level in the crystallizer that impacted, at least in part, the crystallization process. Although not wishing to be bound by theory, it is believed that when the soluble silicates content is above a certain threshold level in the crystallizer feed, such excess in soluble silicates content may interfere with crystal growth and impact the shape of the sodium carbonate crystals, for example by forming elongated crystals which are more prone to breakage and which result in a more brittle soda ash product.

Several tests were performed in the laboratory with addition of various magnesium compounds to remove some of the soluble silicates as shown in Examples 1-4. These tests indicated that $MgCl_2$ was the most effective in reducing the soluble silicates content. The recycling of sodium carbonate decahydrate recovered from the tailings pond was resumed in the soda ash plant, and a magnesium chloride treatment was initiated at the same time in a second recycle season (no. 2). It was observed that the formation of fines in the soda ash declined when the sodium carbonate containing the recycled 'deca' was treated with $MgCl_2$.

The fines content of the soda ash final product were compared when the soda ash plant was operated with or without recycling sodium carbonate decahydrate recovered from a tailings pond, and with or without $MgCl_2$ treatment. The fines content was assessed by the percentage of the soda ash final product which passed through a 100-U.S. mesh size screen (wherein a 100-mesh size generally corresponds to 0.149 millimeter or 149 microns). As shown in TABLE 7, there was little impact of $MgCl_2$ on the fines content of the soda ash final product when there was no 'deca' recycling. On the other end, the recycling of the 'deca' increased the amount of fines being generated, and a treatment with $MgCl_2$ reduced the negative impact that recycling 'deca' had on the fines production of the soda ash final product.

TABLE 7

Fines content in soda ash finished product with and without recycling reclaimed sodium carbonate decahydrate and with or without treatment with $MgCl_2$ in the soda ash plant

|  | With decahydrate recycle | | Without decahydrate recycle | |
| --- | --- | --- | --- | --- |
|  | With $MgCl_2$ | Without $MgCl_2$ | With $MgCl_2$ | Without $MgCl_2$ |
| Fines content (Average % passing through 100-mesh) | 6.51 | 7.58 | 5.85 | 5.86 |
| Standard deviation | 1.70 | 2.48 | 1.3 | 1.92 |
| N* | 53 | 48 | 23 | 111 |

Over the course of several magnesium treatment campaigns during season No. 2 when 'deca' was recycled, a magnesium chloride aqueous solution (27% by weight) was added at various addition points in the soda ash plant according to FIG. 2 selected from the following: at point 25 to the weak liquor stream 15' which was an unsaturated solution having a temperature of about 126° F. (52.2° C.); at point 18 to the rake classifier overflow which was a saturated or near-saturated solution having a temperature of about 180° F. (82.2° C.) before it was fed to the first thickener 13 operated at a temperature of about 170° F. (76.7° C.); or at point 17 to the dissolver where the decahydrate was being melted and dissolved in water to form an unsaturated sodium carbonate decahydrate solution at a temperature of about 108° F. (42.2° C.). The resulting fines content in the finished soda ash product was measured during the various magnesium treatments. The results are shown in TABLE 8. A 't-test' statistical method was used to compare the fines content, and it was determined that there was a statistically significant difference between the final product percent passing the 100-mesh screen between seasons No. 1 and 2.

TABLE 8

Fines content in soda ash finished product with addition of $MgCl_2$ when recycling of reclaimed sodium carbonate decahydrate

| | With recycling of sodium carbonate decahydrate | | | Without recycling of 'deca' |
|---|---|---|---|---|
| Addition Point of $MgCl_2$ | To decahydrate dissolver (17) | To weak liquor stream (25) | To classifier overflow (18) | none |
| Fines content (Average % passing through 100-mesh) | 6.76 | 5.39 | 6.03 | 7.58 |
| Standard deviation | 1.83 | 1.28 | 1.90 | 2.48 |
| N* | 25 | 20 | 76 | 48 |
| lb $MgCl_2$/lb 'deca' | 0.03 | 0.06 | 0.04 | — |

*Number of samples analyzed

Figure 5:
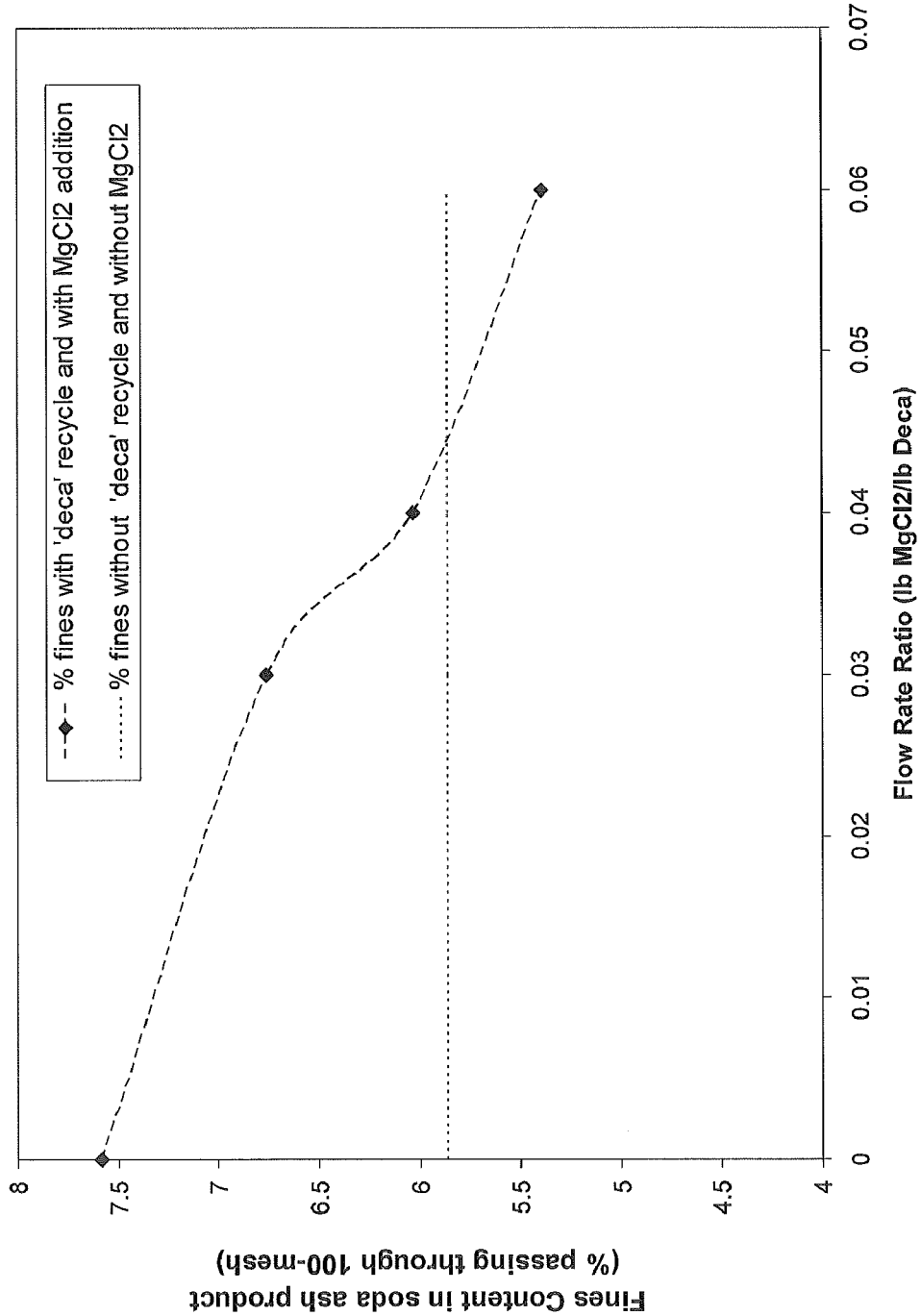
FIG. 5 illustrates the improved quality in a soda ash final product as a sodium carbonate-containing solution is treated with $MgCl_2$ when sodium carbonate decahydrate deposited in and collected from a tailings pond is reclaimed in the soda ash process.

It was observed that the fines content in the soda ash final products decreased when $MgCl_2$ was added regardless of where the $MgCl_2$ was added. For comparison, it should be noted that, when the soda ash was produced from calcined trona without recycling of sodium carbonate decahydrate, the average percentage of the final product which passed through a 100-mesh size screen was 5.86% without $MgCl_2$ addition and 5.85% with $MgCl_2$ addition. Although the addition of $MgCl_2$ to the weak liquor stream (unsaturated in sodium carbonate) based on TABLE 8 appeared to have a greater impact in reducing the fines content of the final product, the decreased fines content seemed more linked to the amount of magnesium added relative to the amount of decahydrate being recycled rather than being linked to a particular location where $MgCl_2$ was added. That is to say, the greater the amount of $MgCl_2$ being added relative to the amount of recycled 'deca', the lesser fines content in the soda ash final product. For illustration purpose, the fines content in soda ash was plotted versus the ratio of mass flow rates of Mg to 'deca' (lb $MgCl_2$/lb 'deca') in FIG. 5 at the three addition points in the soda ash plant. As shown in FIG. 5, there was a trend of decreasing fines content in the finished soda ash product as the ratio of mass flow rates of Mg to 'deca' increased.

Figure 6:
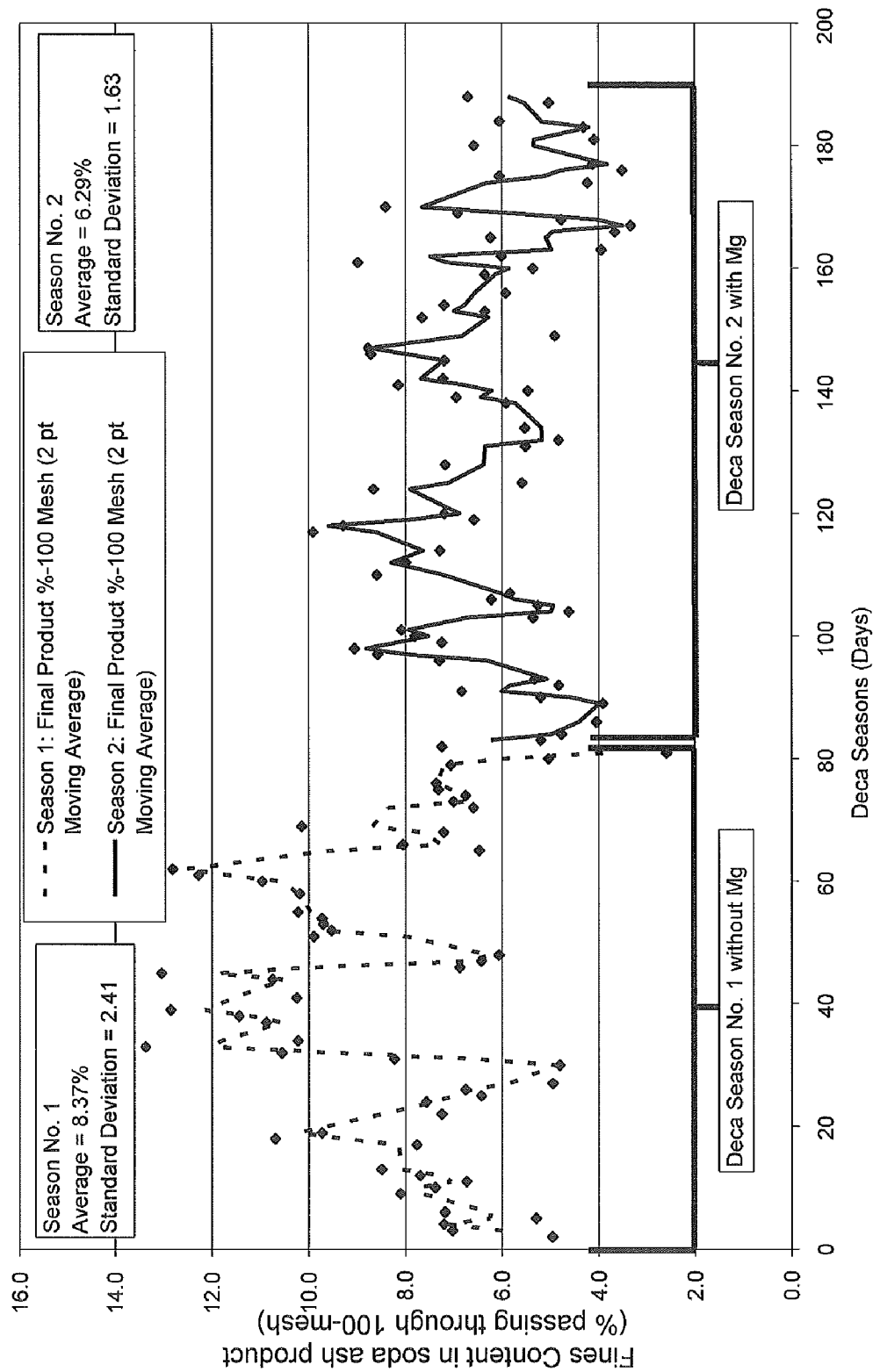
FIG. 6 represents the observed fines content in a soda ash final product during two 'deca' recycle seasons when a sodium carbonate decahydrate deposit is collected from a tailings pond and recycled to the soda ash process, a first recycle season being without treatment with $MgCl_2$ and a second recycle season being with treatment with $MgCl_2$.

FIG. 6 represents the fines content of the finished product during the two 'deca' recycling seasons No. 1 (without Mg treatment) and 2 (with Mg treatment). Although the fines content varied quite extensively during each recycle season, the treatment with $MgCl_2$ resulted on average in an overall drop of about 1.9% in fines content during the season No. 2 compared to the season No. 1 without magnesium treatment, which corresponds to a 23% reduction in fines formation.

The amount of silicates was also measured with and without the magnesium treatment in the filtrate (shown as 27 in FIG. 2). The results are shown in TABLE 9. The amount of Mg which was added when 'deca' was recycled should have been sufficient to achieve 78 ppm Si in the filtrate 27. With an average amount of about 88 ppm Si, the efficiency of silicates removal was about 78%. A 't-test' statistical method was used to compare the silicon content, and it was determined that there was a statistically significant difference in the ppm Si content in the filtrate 27 between seasons No. 1 and 2.

TABLE 9

Content in ppm Si of the filtrate solution (purified solution)

| | With 'deca' recycle | | Without 'deca' recycle |
|---|---|---|---|
| | With $MgCl_2$ | Without $MgCl_2$ | Without $MgCl_2$ |
| Observed ppm Si in filtrate (27) | 88 | 123 | 80 |

During the 'deca' recycle season No. 1, the volume of 'deca' introduced into the soda ash process had to be reduced not only due to a shift towards a smaller particle size of the final product, but also due to higher incidence of foaming in the crystallizer. During the 'deca' season No. 1 as previously mentioned, foaming issues were encountered in the crystallizer bodies. During season No. 2 with concurrent deca recycle and addition of magnesium chloride upstream of the crystallizer, production operators noted that crystallizer foaming was not as prevalent while it was an operational issue in season No. 1. Although not wishing to be bound by a particular theory, it is believed that the magnesium treatment during season No. 2 may have been also effective in reducing the content in soluble foam-causing agent(s) such as surface-active agent(s) in the treated solution which for the most part ended up in the crystallizer feed. Such foam-causing compound(s) were most likely carried over from the recycled 'deca'. By their interaction with the added magnesium compound, there was a reduction in the content or in the foam-causing propensity of these agent(s).

Thus, based on these tests, it is believed that the content of or the foam-causing tendency of these agents may be reduced by a magnesium addition to a saturated/near-saturated or unsaturated solution containing sodium carbonate, at least a portion of which is from sodium carbonate decahydrate recovered from a tailings pond, by adding at least one magnesium compound.

Figure 7:
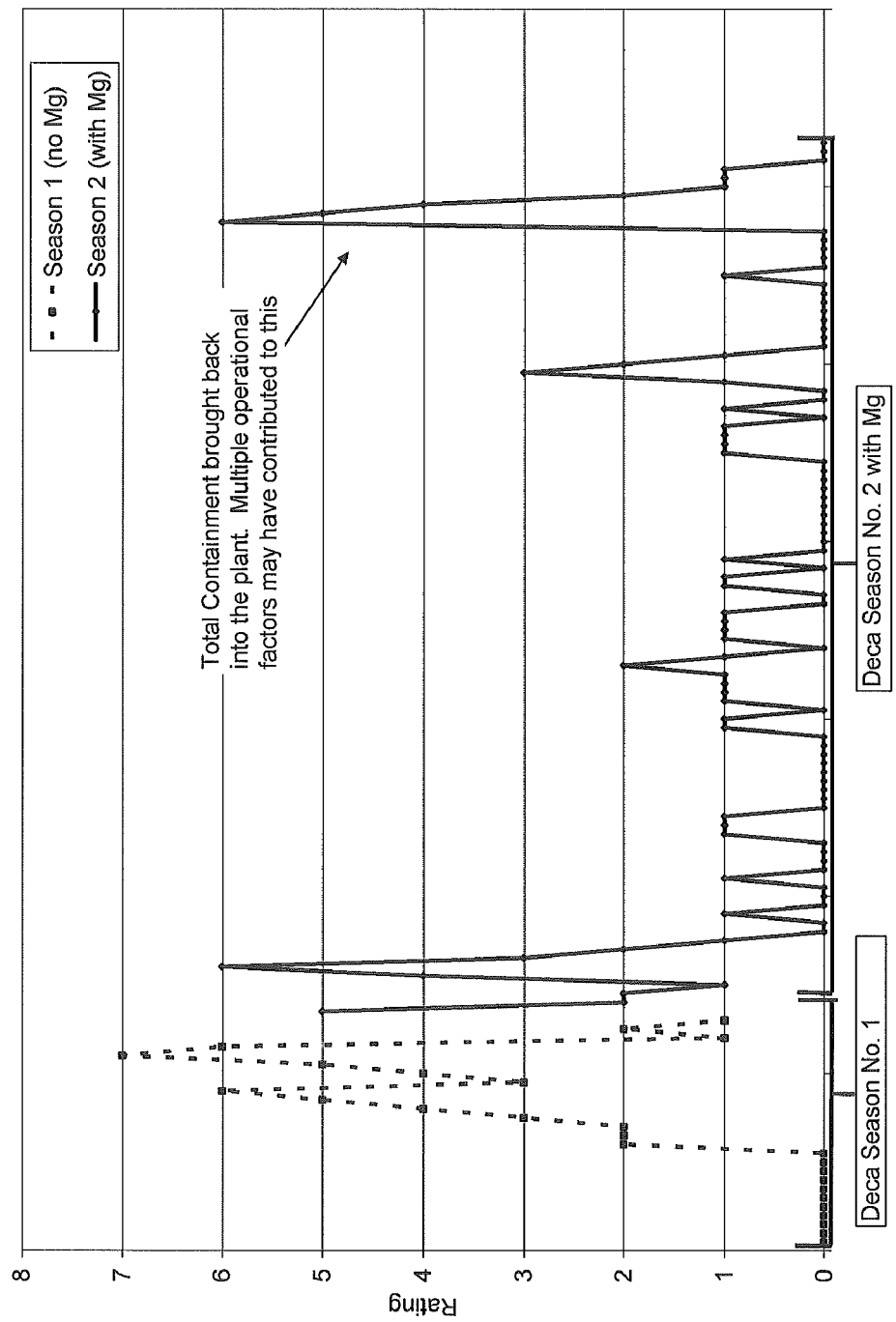
FIG. 7 represents the observed foam incidence in a sodium carbonate monohydrate crystallizer during the two 'deca' recycle seasons, one being without treatment with $MgCl_2$ and the other being with treatment with $MgCl_2$.
Figure 8:
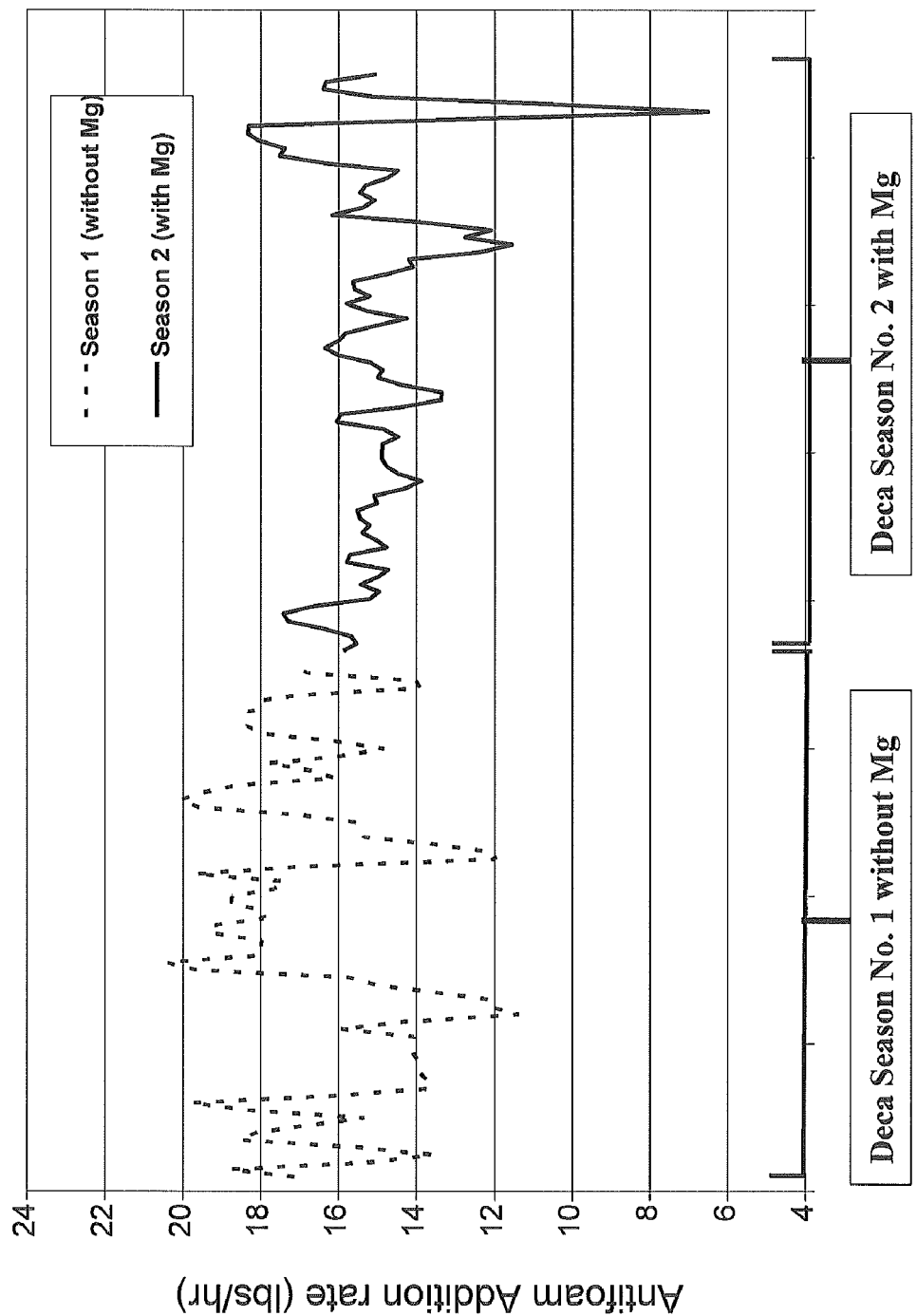
FIG. 8 represents the anti-foam usage in a sodium carbonate monohydrate crystallizer during the two 'deca' recycle seasons, one being without treatment with $MgCl_2$ and the other being with treatment with $MgCl_2$.

During season No. 1, the operators started to do a qualitative assessment of the crystallizer foaming almost every day using an arbitrary foam rating system of from 0 to 10, 0 being no foam and 10 being extreme foam. FIG. 7 illustrates these observations for the time when they were performed during the two deca recycling seasons. The average of these observations are listed in TABLE 10. Addition, of antifoam was also recorded and represented in FIG. 8. A 't-test' statistical method was used to compare the crystallizer foaming rating and antifoam usage rate, and it was determined that there was a statistically significant difference in the foaming rating and antifoam usage between seasons No. 1 and 2. During season No. 2, there was less crystallizer foaming and less antifoam usage even though higher decahydrate recycle rates were used in comparison to season No. 1.

TABLE 10

Foam ratings, defoamer usage, recycled decahydrate tonnage, and trona ore (%) during recycled 'deca' Season No. 1 (without MgCl$_2$ treatment) and recycled 'deca' Season No. 2 (with MgCl$_2$)

| | Foaming Rating (arbitrary units) | | Recycled deca (tons/day) | | Antifoam Usage (lb/hr) | | Trona ore (%) | |
|---|---|---|---|---|---|---|---|---|
| | Season 1 | Season 2 | Season 1 | Season 2 | Season 1 | Season 2 | Season 1 | Season 2 |
| Avg | 2.04 | 0.81 | 556.85 | 873.29 | 16.31 | 14.90 | 93.57 | 94.00 |
| Std Dev. | 2.29 | 1.29 | 260.75 | 408.63 | 2.84 | 1.97 | 2.00 | 1.83 |
| N | 26 | 99 | | | 70 | 80 | 67 | 79 |

The trona was also analyzed to account for possible variation in the ore material which was used to make soda ash. The data is shown in TABLE 10. A 't-test' statistical method was used to compare the trona ore content, and it was determined that there was no statistical difference in the trona ore content between seasons No. 1 and 2.

Accordingly, the scope of protection is not limited by the description and the Examples set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention. Accordingly, the scope of protection is not limited to the embodiments described herein, but is only limited by the claims that follow, the scope of which shall include all equivalents of the subject matter of the claims.

The invention claimed is:

1. A method for reducing the content in water-soluble impurities originating from a waste which is used before a crystallization step in a manufacturing process that produces a crystalline product comprising sodium carbonate, sodium sulfite, or sodium bicarbonate, the method comprising the following steps:
    providing a waste comprising water-soluble impurities selected from the group consisting of silicates, organic foam-causing agents, and combinations thereof;
    performing a magnesium treatment on at least a portion of said waste to form a treated solution, said treatment comprising adding a magnesium compound to the waste in order to form water-insoluble matter with at least a portion of said impurities, wherein when the waste is in solid form, the waste is dissolved in an aqueous medium before or after the magnesium treatment;
    passing a liquor comprising at least a portion of said treated solution though at least one separation unit to obtain a purified solution; and
    forming crystals comprising sodium carbonate, sodium sulfite, or sodium bicarbonate by performing at least the following step: passing at least a portion of the purified solution in a reactor and/or a crystallizer under conditions suitable to form said crystals.

2. A method for reducing the content of water-soluble impurities in a sodium carbonate-containing aqueous solution to produce crystalline soda ash, sodium sulfite, or sodium bicarbonate in a process which uses calcined trona and a waste which contains a reclaimed solid, the method comprising the following steps:
    providing a waste comprising or consisting of a reclaimed solid comprising water-soluble impurities being selected from the group consisting of silicates, organic foam-causing agents, and combinations thereof, said reclaimed solid further comprising one sodium compound selected from the group consisting of sodium carbonate decahydrate, sodium carbonate monohydrate, sodium carbonate heptahydrate, sodium bicarbonate, sodium sesquicarbonate, and any combinations of two or more thereof;
    performing a magnesium treatment on at least a portion of said waste to form a treated solution, said treatment comprising adding a magnesium compound to the waste in order to form water-insoluble matter with at least a portion of said impurities, wherein the waste is dissolved in an aqueous medium before or after the magnesium treatment;
    passing a liquor comprising at least a portion of said treated solution though at least one separation unit to remove insoluble matter in order to obtain a purified solution;
    performing at least one of the crystallization steps:
        passing a first crystallizer feed comprising at least a portion of said purified solution through a sodium carbonate monohydrate crystallizer under crystallization promoting conditions to form sodium carbonate monohydrate crystals;
        passing at least a portion of said purified solution comprising sodium carbonate to a sodium sulfite plant where sodium carbonate is reacted with sulfur dioxide to form a sodium sulfite-containing stream and then passing a second crystallizer feed comprising at least a portion of said sodium sulfite-containing stream through a sodium sulfite crystallizer under crystallization promoting conditions suitable to form sodium sulfite crystals;
        passing a third crystallizer feed comprising at least a portion of said purified solution and/or at least a portion of a purge liquor comprising sodium carbonate through a sodium bicarbonate crystallizer under crystallization promoting conditions comprising passing carbon dioxide to form sodium bicarbonate crystals, optionally said purge or mother liquor exiting a sodium carbonate monohydrate crystallizer; and
    recovering and drying said crystals comprising sodium carbonate or comprising sodium sulfite or comprising sodium bicarbonate to form a final product.

3. A method for reducing the content of water-soluble impurities in a sodium carbonate-containing aqueous solution to produce crystalline soda ash, sodium sulfite, or sodium bicarbonate in a process which uses calcined trona and a waste which contains a reclaimed solid, the method comprising the following steps:

provide a reclaimed solid comprising water-soluble impurities being selected from the group consisting of silicates, organic foam-causing agents, and combinations thereof, said reclaimed solid further comprising one sodium compound selected from the group consisting of sodium carbonate decahydrate, sodium carbonate monohydrate, sodium carbonate heptahydrate, sodium bicarbonate, sodium sesquicarbonate, and any combinations of two or more thereof;

providing an unsaturated sodium carbonate-containing solution comprising dissolved reclaimed solid and/or a saturated or near-saturated sodium carbonate-containing solution comprising dissolved reclaimed solid and dissolved calcined trona;

performing a magnesium treatment to form a treated solution, said treatment comprising adding a magnesium compound to at least a portion of the unsaturated sodium carbonate-containing solution or to at least a portion of the saturated or near-saturated sodium carbonate-containing solution or to both in order to form water-insoluble matter with at least a portion of said impurities;

passing a liquor comprising at least a portion of said treated solution through at least one separation unit to remove insoluble matter and to obtain a purified solution;

performing at least one of the crystallization steps:

passing a first crystallizer feed comprising at least a portion of said purified solution through a sodium carbonate monohydrate crystallizer under crystallization promoting conditions to form sodium carbonate monohydrate crystals;

passing at least a portion of said purified solution comprising sodium carbonate to a sodium sulfite plant where sodium carbonate is reacted with sulfur dioxide to form a sodium sulfite-containing stream and then passing a second crystallizer feed comprising at least a portion of said sodium sulfite-containing stream through a sodium sulfite crystallizer under crystallization promoting conditions suitable to form sodium sulfite crystals;

passing a third crystallizer feed comprising at least a portion of said purified solution and/or at least a portion of a purge liquor comprising sodium carbonate through a sodium bicarbonate crystallizer under crystallization promoting conditions comprising passing carbon dioxide to form sodium bicarbonate crystals; and recovering and drying said crystals comprising sodium carbonate or comprising sodium sulfite or comprising sodium bicarbonate to form a final product.

4. The method according to claim 1, wherein forming the crystals comprises performing at least one of the following steps:

feeding at least a portion of the purified solution to a sodium carbonate monohydrate crystallizer to form crystals comprising sodium carbonate;

feeding at least a portion of the purified solution and sulfur dioxide to a sodium sulfite reactor and then to a sodium sulfite crystallizer to form crystals comprising sodium sulfite;

passing carbon dioxide and at least a portion of the purified solution and/or at least a portion of a purge liquor exiting a sodium carbonate monohydrate crystallizer to a sodium bicarbonate reactor under conditions effective to form crystals comprising sodium bicarbonate.

5. The method according to claim 1, wherein the separation step includes passing the liquor through a classifier for recovering a classifier overflow; feeding the classifier overflow to a thickener to remove insoluble matter; and filtering the thickener overflow to provide the purified solution and a weak liquor stream, at least a portion of said weak liquor stream being used to dissolve the waste.

6. The method according to claim 1, wherein the liquor to be separated comprises dissolved calcined trona, the dissolution of calcined trona taking place in the aqueous medium before or during the magnesium treatment or taking place in at least a portion of the treated solution after the magnesium treatment.

7. The method according to claim 1, wherein the treatment with the magnesium compound is carried out on an aqueous solution containing at least a portion of said waste, said aqueous solution being unsaturated in sodium carbonate solution and comprising less than 20 percent sodium carbonate.

8. The method according to claim 1, wherein the treatment with the magnesium compound is carried out on an aqueous solution containing at least a portion of said waste, said aqueous solution being saturated or near-saturated in sodium carbonate solution and comprises 20 percent or more sodium carbonate.

9. The method according to claim 1, wherein the magnesium compound comprises or consists essentially of one or more water-soluble magnesium salts.

10. The method according to claim 1, wherein the magnesium compound comprises or consists essentially of magnesium chloride.

11. The method according to claim 1, wherein the waste is a purge liquor or a reclaimed solid comprising one sodium compound selected from the group consisting of sodium carbonate decahydrate, sodium carbonate monohydrate, sodium bicarbonate, sodium carbonate heptahydrate, sodium sesquicarbonate, and any combinations of two or more thereof, said reclaimed solid being recovered from a tailings pond or a crystallizer, said purge liquor exiting a crystallizer.

12. The method according to claim 11, wherein the crystals formation comprises feeding at least a portion of the purified solution to a sodium carbonate monohydrate crystallizer to form crystals comprising sodium carbonate and a purge liquor stream, said purge liquor stream being used under crystallization conditions to form a sodium carbonate decahydrate solid contaminated with said water-soluble impurities, a portion of said solid being reclaimed, and wherein the waste comprises or consists of said reclaimed solid.

13. The method according to claim 11, wherein the waste is a reclaimed solid recovered from a tailings pond or a crystallizer, said reclaimed solid comprising sodium carbonate decahydrate.

14. The method according to claim 11, wherein the magnesium treatment step comprises at least one of the following treatment steps selected from the group consisting of:

adding the magnesium compound to the reclaimed solid either before or after its dissolution;

adding the magnesium compound to a dissolver, said dissolver being used to melt or dissolve the reclaimed solid;

adding the magnesium compound to a secondary thickener comprising dissolved waste, said secondary thickener being used in the separation step;

adding the magnesium compound to a weak liquor stream comprising dissolved reclaimed solid;

adding the magnesium compound to a weak liquor tank, said weak liquor tank comprising a weak liquor exiting a secondary thickener used in the separation step;

adding the magnesium compound to a leach tank, said leach tank being used to dissolve calcined trona in at least a part of the aqueous medium comprising the dissolved reclaimed solid;

adding the magnesium compound to a saturated or near-saturated aqueous solution comprising dissolved reclaimed solid and dissolved calcined trona at any point between the leach tank and a primary thickener used in the separation step;

adding the magnesium compound to a classifier used in the separation step or to an overflow exiting the classifier;

adding the magnesium compound to a primary thickener used in the separation step or to an overflow exiting the primary thickener;

adding the magnesium compound to a centrate liquor withdrawn from a sodium carbonate monohydrate crystallizer and separated from crystals; and any combinations of two or more of these steps, the magnesium compound being the same or different when used in any of these treatment steps.

15. The method according to claim 1, wherein the treatment with magnesium is effective in achieving at least one of the effects selected from the group consisting of:

reducing the content in water-soluble silicates in the treated solution;

reducing the fines content in a final product comprising crystalline sodium carbonate;

reducing the content in silicon in the crystals comprising sodium sulfite to make a photo-grade sodium sulfite final product;

reducing the content in silicates in the crystals comprising sodium bicarbonate;

reducing the incidence of scale formation in at least one crystallizer heat exchanger;

reducing the content of water-soluble organic foam-causing agents in the treated solution;

reducing the incidence of foaming in at least one of a sodium carbonate monohydrate crystallizer and a sodium bicarbonate crystallizer; and any combinations of two or more thereof.

16. The method according to claim 2, wherein the magnesium compound comprises or consists essentially of magnesium chloride.

17. The method according to claim 2, wherein the waste is a reclaimed solid comprising sodium carbonate decahydrate, said reclaimed solid being recovered from a tailings pond or a crystallizer.

18. The method according to claim 2, wherein calcined trona is dissolved in the aqueous medium before the magnesium treatment or in the treated solution after the magnesium treatment.

19. The method according to claim 3, wherein the magnesium compound comprises or consists essentially of magnesium chloride.

20. The method according to claim 3, wherein the waste is a reclaimed solid comprising sodium carbonate decahydrate, said reclaimed solid being recovered from a tailings pond or a crystallizer.

* * * * *